(12) United States Patent
Fujita

(10) Patent No.: US 7,175,745 B2
(45) Date of Patent: Feb. 13, 2007

(54) METHOD OF MANUFACTURING ELECTROLYZER UNIT, AND METHOD AND SYSTEM FOR WELDING ELECTROLYZER UNIT AND ELECTROLYZER UNIT RIB

(75) Inventor: Koji Fujita, Kokubu (JP)

(73) Assignees: Asahi Kasei Chemicals Corporation, Tokyo (JP); Fujita Works Co., Ltd., Kokubu (JP)

( * ) Notice: Subject to any disclaimer, the term of this patent is extended or adjusted under 35 U.S.C. 154(b) by 315 days.

(21) Appl. No.: 10/363,138

(22) PCT Filed: Sep. 7, 2001

(86) PCT No.: PCT/JP01/07793

§ 371 (c)(1),
(2), (4) Date: Mar. 6, 2003

(87) PCT Pub. No.: WO02/22912

PCT Pub. Date: Mar. 21, 2002

(65) Prior Publication Data

US 2004/0007458 A1 Jan. 15, 2004

(30) Foreign Application Priority Data

Sep. 8, 2000 (JP) ............................. 2000-272779
Sep. 4, 2001 (JP) ............................. 2001-266925

(51) Int. Cl.
*C25B 9/00* (2006.01)
*C25B 9/20* (2006.01)
*C25B 1/46* (2006.01)

(52) U.S. Cl. .................... 204/266; 29/729; 204/258

(58) Field of Classification Search ................ 204/258, 204/266

See application file for complete search history.

(56) References Cited

U.S. PATENT DOCUMENTS 4,059,216 A 11/1977 Meyer (Continued)

FOREIGN PATENT DOCUMENTS

BE 876585 A 9/1979

(Continued)

*Primary Examiner*—Harry D Wilkins, III
(74) *Attorney, Agent, or Firm*—Birch, Stewart, Kolasch & Birch, LLP

(57) ABSTRACT

The invention has an object of facilitating the detection of defective welds and improving the efficiency of manufacturing electrolyzer units. A a method of manufacturing an electrolyzer unit comprises a step of arranging a partition member on a front surface of a cathode pan and welding a top side and a left side of the cathode pan to the partition member to form a gas-liquid separation chamber, a step of performing a similar step on an anode pan, a step of arranging cathode ribs on a front surface of the cathode pan and clad plates on a back surface of the cathode pan at positions corresponding to the cathode ribs, welding them at the same time, putting a back surface of the anode pan over the back surface of the cathode pan and arranging anode ribs on a front surface of the anode pan at positions corresponding to the clad plates, a step of simultaneously performing on the anode pan a similar step of arranging anode ribs on a front surface of the anode pan at positions corresponding to the clad plates, and a step of inserting frame members into spaces formed between flange portions of the cathode pan and flange portions of the anode pan.

5 Claims, 32 Drawing Sheets

U.S. PATENT DOCUMENTS

| | | | |
|---|---|---|---|
| 4,138,324 A | 2/1979 | Meyer | |
| 5,571,390 A * | 11/1996 | Kimura et al. | 204/254 |

FOREIGN PATENT DOCUMENTS

| | | |
|---|---|---|
| DE | 26 56 110 A1 | 6/1977 |
| EP | 0 521 386 A2 | 1/1993 |
| JP | 51-43377 A | 4/1976 |
| JP | 58-71382 A | 4/1983 |
| JP | 62-96688 A | 5/1987 |
| JP | 64-8287 A | 1/1989 |
| JP | 2-22273 U | 2/1990 |
| JP | 2-179365 A | 7/1990 |
| JP | 3-249189 A | 11/1991 |
| JP | 4-288990 A | 10/1992 |
| JP | 54-88849 A | 10/1992 |
| JP | 5-9770 A | 1/1993 |
| JP | 6-292974 A | 10/1994 |
| JP | 8-164491 A | 6/1996 |
| JP | 8-197264 A | 8/1996 |
| JP | 9-95792 A | 4/1997 |
| JP | 52-78771 | 7/1997 |
| JP | 9-314349 A | 12/1997 |
| JP | 10-158875 A | 6/1998 |
| JP | 11-33737 A | 2/1999 |
| JP | 11-58023 A | 3/1999 |
| JP | 11-285845 A | 10/1999 |
| JP | 2000-26987 A | 1/2000 |
| JP | 2000-225472 A | 8/2000 |
| WO | WO 86/05216 A1 | 9/1986 |

\* cited by examiner

METHOD OF MANUFACTURING ELECTROLYZER UNIT, AND METHOD AND SYSTEM FOR WELDING ELECTROLYZER UNIT AND ELECTROLYZER UNIT RIB

This application is the national phase under 35 U.S.C. § 371 of PCT International Application No. PCT/JP01/07793 which has an International filing date of Sep. 7, 2001, which designated the United States of America.

TECHNICAL FIELD

The present invention relates to an electrolyzer unit that forms a bipolar electrolyzer for electrolyzing an alkaline metal chloride aqueous solution to produce chlorine and alkaline metal hydroxides.

The invention also relates to a welding technique suited for manufacturing such an electrolyzer unit.

BACKGROUND ART

Various types of bipolar electrolyzers for electrolyzing an alkaline metal chloride aqueous solution such as a salt solution through an ion exchange membrane method have been proposed, for example, in Japanese Patent Disclosure Nos. 51-43377, 58-71382, 62-96688, 5-9770, 9-95792, 10-158875 and 2000-26987.

FIG. 25 is a cross sectional view showing a typical example of an electrolyzer unit which has been used in conventional bipolar electrolyzers.

The conventional electrolyzer unit 100 has an anode chamber 104 constructed of an anode pan 101, anode ribs 102 arranged on a surface of the anode pan 101 and an anode 103 connected to end faces of the anode ribs 102. The anode pan 101, the anode ribs 102 and the anode 103 are made of titanium that has an excellent corrosion resistance.

Also provided is a cathode chamber 108 constructed of a cathode pan 105, cathode ribs 106 arranged on a surface of the cathode pan 105 and a cathode 107 connected to end faces of the cathode ribs 106. The cathode pan 105, the cathode ribs 106 and the cathode 107 are formed of a material with an excellent alkali resistance, such as nickel, stainless steel, iron and iron-nickel alloy (hereinafter referred to as nickel or the like).

Between a back surface of the cathode pan 105 and a back surface of the anode pan 101 are arranged clad plates 111, which are formed by explosion-bonding together a titanium layer 109 and a nickel (or iron) layer 110, with the titanium layer 109 welded to the anode pan 101 and with the nickel layer 110 welded to the cathode pan 105.

These clad plates 111 are interposed between titanium and nickel as it is difficult to weld them directly.

At the top of the anode pan 101 is arranged a partition member 112 of titanium, L-shaped in cross section, which forms an anode-side gas-liquid separation chamber 113. The partition member 112 has an opening 114 in a horizontal surface thereof to ensure flows of liquid and gas into and from the anode chamber 104.

Also at the top of the cathode pan 105 is arranged a partition member 115 of nickel or the like, L-shaped in cross section, which forms a cathode-side gas-liquid separation chamber 116. The partition member 115 has an opening 118 in a horizontal surface thereof to ensure flows of liquid and gas into and from the cathode chamber 108.

The anode ribs 102 and the cathode ribs 106 are both formed with through-holes 119, 120 to ensure flows of the liquid and gas in transverse directions.

The anode pan 101 and the cathode pan 105 have at their periphery flange portions 121, 122 that are bent like a hook. In spaces between the anode-side flange portions 121 and the cathode-side flange portions 122 are installed reinforcing frame members 123 of stainless steel or the like. Front ends of the flange portions 121, 122 engage grooves in the frame members 123.

While FIG. 25 shows only two frame members 123, 123 at the top and bottom, two more frame members are actually provided on the left and right sides of the electrolyzer unit 100.

Among these frame members 123, the one installed at the bottom has a through-hole communicating with the cathode chamber 108, in which hole is installed a nozzle 124 for supplying a liquid. Though not shown in the figure, the frame member 123 has another through-hole communicating with the anode chamber 104, in which is installed a nozzle for liquid supply.

A large number of the electrolyzer units 100 of the above construction are arranged side-by-side in a horizontal direction so that the cathode 107 of one electrolyzer unit and the anode 103 of the adjoining unit oppose each other, as shown in FIG. 26. Between the anode 103 and the cathode 107 are interposed an anode-side seal member 125, a cation exchange membrane 126 and a cathode-side seal member 127. They are pressurized and fixed from the sides by a press machine not shown.

When pure water and refined brine are supplied to the cathode-side nozzle 124 and the anode-side nozzle, respectively, of each electrolyzer unit 100 and a predetermined DC voltage is applied between the anode 103 and the cathode 107, an electrolytic reaction produces chlorine gas and diluted saltwater in the anode chamber 104 and hydrogen gas and a caustic soda aqueous solution in the cathode chamber 108.

Then, the electrolysis products that have reached the gas-liquid separation chambers 113, 116 on the anode and cathode sides are led out through discharge nozzles not shown.

The brine electrolysis process by the ion exchange membrane method has an advantage of having less adverse effects on the environment as compared with the diaphragm method using asbestos and a mercury method.

Referring to FIG. 27 to FIG. 32, the manufacturing process of the conventional electrolyzer unit 100 will be explained.

First, as shown in FIG. 27, a plurality of cathode ribs 106 are arrayed through a jig not shown on a surface 105a of the cathode pan 105 which is formed through bending and welding. A flanged portion 106a of each cathode rib 106 is welded to the surface 105a of the cathode pan 105 by using a DC/AC spot welder.

A lower end portion 106b of each cathode rib 106 is manually TIG-welded to an inner wall surface 105b of the cathode pan 105.

Next as shown in FIG. 28, the cathode pan 105 is turned over, and on its back surface 105c a plurality of clad plates 111 are arrayed at constant intervals and welded to the back surface by the DC/AC spot welder. Then, between the clad plates 111 are arranged reinforcement members 128 made of porous metal which are then TIG-welded to the back surface 105c of the cathode pan.

Then, as shown in FIG. 29, the back surface of the anode pan 101 is placed on the back surface 105c of the cathode pan. As with the cathode pan 105, the anode pan 101 is also formed by bending and welding and has similar vertical and horizontal dimensions to those of the cathode pan.

Next, as shown in FIG. 30, the frame members 123 are successively inserted between the hook-shaped flange portions 121, 122 of the cathode pan 105 and the anode pan 101 along their four sides.

Further, the clad plates 111 are spot-welded to the back surface of the anode pan 101.

Next, as shown in FIG. 31, on a surface 101a of the anode pan 101 a plurality of anode ribs 102 are arrayed through a jig, not shown, and a flanged portion 102a of each anode rib 102 is welded to the anode pan 101 by using the DC/AC spot welder.

TIG-welding is manually effected on the contact between a lower end portion 102b of each anode rib 102 and an inner wall surface 101b of the anode pan 101.

Next, a discharge box 130 is TIG-welded to a notched portion 129 in the flange portion 121 of the anode pan 101. The discharge box 130 is connected with a discharge nozzle 131.

The L-shaped partition member 112 is placed on the anode pan, and a top side 112a, a left side 112b and a right side 112c of the partition member 112 are TIG-welded to the flange portion 121 of the anode pan 101, and a bottom side 112d of the partition member 112 and the surface 101a of the anode pan 101 are TIG-welded to form the anode-side gas-liquid separation chamber 113.

After this, an assembly of the anode pan 101 and the cathode pan 105 is turned over so that the surface 105a of the cathode pan 105 faces up (not shown). As with the anode side, a discharge box 133 and a discharge nozzle 134 are welded to a notched portion 132 of the cathode-side flange portion 122, and the L-shaped partition member 115 is also welded to form the cathode-side gas-liquid separation chamber 116.

Then, as shown in FIG. 32, the cathode-side supply nozzle 124 and the anode-side supply nozzle 135 are mounted in the through-holes of the bottom frame member 123.

Further, the anode 103 (titanium porous plate or meshed material) is placed over the end faces of the anode ribs 102, and they are welded together using a multispot welder.

Moreover, the cathode 107 (nickel porous plate or meshed material) is placed over the end faces of the cathode ribs 106, and they are welded together using the multispot welder. Thus, the electrolyzer unit 100 is completed.

As described above, in the conventional process of manufacturing the electrolyzer unit 100, there are many welding steps. Generally, as the number of welding steps increases, not only do the time and labor increase to that extent but a risk of liquid leakage due to welding failure also becomes high.

Considering the uses of the electrolyzer unit 100, liquid leakage at welding locations are never tolerated. In the conventional manufacturing process, however, since the frame members 123 are inserted at an early stage to combine the anode pan 101 and the cathode pan 105, a problem arises that faulty welding locations cannot be detected effectively.

More specifically, in welded portions between the top side 112a of the anode-side partition member 112 and the flange portion 121 of the anode pan 101 or in welded portions between the top side 115a of the cathode-side partition member 115 and the flange portion 122 of the cathode pan 105, checks from the inside cannot be made at all because the frame members 123 are already inserted between the flange portions 121, 122 at the time of welding although these locations easily develop cracks and holes due to defective welding. The only check that can be made is from the outside. Such is the present situation in welded portions. A similar problem arises with the welding between the lower end portion 102b of each anode rib and the inner wall surface 101b of the anode pan.

Further, in the conventional method of manufacturing the electrolyzer unit 100, because the anode pan 101 and the cathode pan 105 are combined together by inserting the frame members 123 at an early stage and parts such as the discharge boxes 130, 133 and the partition members 112, 115 are assembled into these pans, it is necessary to turn over the assembly of the cathode pan 105 and the anode pan 101 a number of times. This degrades the handling performance. Although the anode pan 101 and the cathode pan 105 are as thin as 1 mm to several mm, the vertical and horizontal dimensions reach 1.2 m×2.4 m or greater and their total weight is significantly large.

The present invention has been accomplished to solve the above problems in the manufacturing process of the conventional electrolyzer unit. An object of the invention is to improve the structure of the electrolyzer unit itself and its manufacturing process to realize the facilitation of detection of defective welding and a reduction in the number of welding locations and to improve the welding method and welding system, thereby enhancing the efficiency of manufacturing the electrolyzer unit.

DISCLOSURE OF INVENTION

To attain the above object, a method of manufacturing an electrolyzer unit as set forth in claim 1 comprises a step of arranging a partition member on a front surface of a first pan formed with flange portions at its periphery and welding at least a part of the partition member to the flange portions of the first pan to form a gas-liquid separation chamber, a step of arranging a partition member on a front surface of a second pan formed with flange portions at its periphery and welding at least a part of the partition member to the flange portions of the second pan to form a gas-liquid separation chamber, a step of arranging a plurality of first ribs on the front surface of the first pan and welding together the front surface of the first pan and the respective ribs, a step of arranging a plurality of clad plates on a back surface of the first pan and welding the back surface of the first pan and one surface of the clad plates, a step of putting the back surface of the first pan over a back surface of the second pan and welding the back surface of the second pan to the other surfaces of the clad plates, a step of arranging a plurality of second ribs on the front surface of the second pan and welding the front surface of the second pan and the respective ribs, and a step of inserting frame members into spaces formed between the flange portions of the first pan and the flange portions of the second pan.

One of the first pan and the second pan corresponds to an anode pan and the other corresponds to a cathode pan.

According to this manufacturing method, welding between the partition members and the flange portions is carried out before the frame members are inserted between the flange portions of the first pan and the second pan, and therefore, the welded portions can be observed reliably from the back of the flange portions. The welding between the partition members and the flange portions is effected by manual TIG-welding in many cases, and the welding precision is liable to vary depending on the skill of a worker. Thus the realization of checking the welded portions from the back for cracks or holes is very effective in maintaining quality. If a defective weld is found, it can be dealt with at an early stage of manufacture, thereby minimizing a loss.

Conventionally, it has been considered important to stabilize the shape of the electrolyzer unit by inserting the frame members at an early stage in order to prevent deformations from developing in the pan during the process of welding the ribs and partition member to the pan. However, even before the frame members are inserted, it is sufficiently possible to suppress thermal strains of the pan by taking such measures as "reverse straining" and "cooling metal" (if the first pan and the second pan are fixed together by inserting the frame members, the reserve straining and cooling metal measures become difficult to perform as the other pan interferes with the operation). For this reason, it can be said that there is a larger merit in being able to reliably detect faulty welds at an early stage. Further, there is another advantage of being able to move and inspect individual pans until the frame members are inserted.

A method of manufacturing an electrolyzer unit as set forth in claim 2 comprises a step of arranging a partition member on a front surface of a first pan formed with flange portions at its periphery and welding at least a part of the partition member to the flange portions of the first pan to form a gas-liquid separation chamber, a step of arranging a partition member on a front surface of a second pan formed with flange portions at its periphery and welding at least a part of the partition member to the flange portions of the second pan to form a gas-liquid separation chamber, a step of arranging a plurality of first ribs on the front surface of the first pan, arranging a plurality of clad plates on a back surface of the first pan at positions corresponding to the respective ribs, and simultaneously performing welding between the front surface of the first pan and the respective ribs and between the back surface of the first pan and one surface of the clad plates, a step of putting a back surface of the second pan over the back surface of the first pan, arranging a plurality of second ribs on the front surface of the second pan at positions corresponding to the clad plates welded to the back surface of the first pan, and simultaneously performing welding between the front surface of the second pan and the respective ribs and between the back surface of the second pan and the other surfaces of the clad plates, and a step of inserting frame members into spaces formed between the flange portions of the first pan and the flange portions of the second pan.

According to this manufacturing method, the simultaneous welding between first ribs, first pan and clad plates can be realized by positioning the first ribs and the clad plates to oppose each other with the first pan interposed therebetween. Further, the simultaneous welding between second ribs, second pan and clad plates can be realized by positioning the second ribs and the clad plates to oppose each other with the second pan interposed therebetween. Therefore, a substantial reduction in the number of welding steps can be achieved.

A capacitor type projection welding may be employed as the welding method in this case.

A method of manufacturing an electrolyzer unit as set forth in claim 3 comprises a step of arranging a partition member on a front surface of a first pan formed with flange portions at its periphery and welding at least a part of the partition member to the flange portions of the first pan to form a gas-liquid separation chamber, a step of arranging a partition member on a front surface of a second pan formed with flange portions at its periphery and welding at least a part of the partition member to the flange portions of the second pan to form a gas-liquid separation chamber, a step of arranging a plurality of first ribs on the front surface of the first pan, arranging a plurality of clad plates on a back surface of the first pan at positions corresponding to the respective ribs, putting a back surface of the second pan over the back surface of the first pan, arranging a plurality of second ribs on the front surface of the second pan at positions corresponding to the clad plates, and simultaneously performing welding between the front surface of the first pan and the respective ribs, between the back surface of the first pan and one surface of the clad plates, between the back surface of the second pan and the other surfaces of the clad plates and between the front surface of the second pan and the respective ribs, and a step of inserting frame members into spaces formed between the flange portions of the first pan and the flange portions of the second pan.

According to this manufacturing method, by positioning the first ribs and the clad plates to oppose each other with the first pan interposed therebetween and by positioning the second ribs and the clad plates to oppose each other with the second pan interposed therebetween, the simultaneous welding can be realized between first ribs, first pan and clad plates and between second ribs, second pan and clad plates. This enables a further reduction in the number of welding steps.

A method of manufacturing an electrolyzer unit as set forth in claim 4 is characterized by, when arranging the first ribs on the front surface of the first pan, fitting front ends of the respective ribs into a plurality of openings formed beforehand in the partition member and then performing welding between the front surface of the first pan and the respective ribs, and when arranging the second ribs on the front surface of the second pan, fitting front ends of the respective ribs into a plurality of openings formed beforehand in the partition member and then performing welding between the front surface of the second pan and the respective ribs.

As a result, the partition members are secured toward the front surfaces of the first and second pans by the respective ribs. This allows welding between the partition members and the pan surfaces to be omitted.

A method of manufacturing an electrolyzer unit as set forth in claim 5 is characterized by, before inserting all the frame members into the spaces formed between the flange portions of the first pan and the flange portions of the second pan, inserting reinforcement members into vacant spaces between the back surface of the first pan and the back surface of the second pan.

In the electrolyzer unit manufacturing methods according to the invention, as described above, the frame members are inserted after the first pan and the second pan are welded together through the clad plates. The first pan and the second pan are held relatively firmly even before the frame members are inserted, and therefore, the reinforcement members can be inserted into spaces between the back surfaces of the two pans. After the insertion of the reinforcement members, the peripheries of the first pan and the second pan are closed by the frame members, so that the reinforcement members will not fall out even without providing extra fixing means.

On the contrary, in the conventional practice, the frame members are inserted before welding the first pan and the second pan. This requires the reinforcement members to be TIG-welded to the back surface of one of the pans to prevent the reinforcement members from slipping during the process. Not only does this take time and labor but it also raises a risk of liquid leakage due to welding defects.

A method of manufacturing an electrolyzer unit as set forth in claim 6 is characterized by, before arranging the partition members on the front surfaces of the first pan and the second pan, welding discharge boxes to the partition members.

As described above, the conventional practice is in the manner of fixing the two pans through the insertion of the frame members, then directly welding the discharge boxes to the front surfaces of the pans, and covering them with the partition members. Accordingly, there is a problem that, even when a check for possible defective welds between the discharge box and the pan is attempted, such check cannot be performed from the back as the other pan obstructs. If any defective weld should fail to be detected, a liquid leakage to the back surface of the pan will result during the operation of the electrolyzer.

In contrast, when the discharge boxes are welded to the partition members as described above, a thorough inspection can be made at the stage where the partition members are not welded to the pans yet, i.e., when a sufficient leeway is still available. Further, if a defective weld is found, the loss is minimal because the partition members are not yet welded to the pans. Further, since there is a sufficient space for applying the cooling metal, the thermal strains during welding can be prevented sufficiently.

A method of manufacturing an electrolyzer unit as set forth in claim 7 is characterized by, among the frame members, forming through-holes in those arranged at a top and a bottom of the electrolyzer unit at corresponding positions, after inserting the frame members into the spaces formed between the flange portions of the first pan and the flange portions of the second pan, inserting tension rods through the through-holes into vacant spaces between the back surface of the first pan and the back surface of the second pan, joining upper ends of the tension rods to the top frame member, and joining lower ends of the tension rods to the bottom frame member.

An electrolyzer unit as set forth in claim 8 comprises a first pan formed with flange portions at its periphery, a plurality of first ribs electrically connected to a front surface of the first pan, a first electrode electrically connected to the respective ribs, a second pan formed with flange portions at its periphery, a plurality of second ribs electrically connected to a front surface of the second pan, and a second electrode electrically connected to the respective ribs, wherein a back surface of the first pan and a back surface of the second pan are electrically connected through clad plates and frame members are inserted into spaces formed between flange portions of the first pan and flange portions of the second pan. The unit is characterized in that, among the frame members, those arranged at a top and a bottom of the electrolyzer unit are formed with through-holes at corresponding positions, tension rods are inserted through the through-holes into vacant spaces between the back surface of the first pan and the back surface of the second pan, upper ends of the tension rods are joined to the top frame member, and lower ends of the tension rods are joined to the bottom frame member.

During the operation of the electrolyzer, a downward load is caused by the weight of raw material liquid and electrolysis products. The conventional practice involves TIG-welding the lower ends of the ribs to the inner wall surface of each pan as described above to prevent the electrolyzer unit from being curvedly deformed. Manually welding the large number of ribs to the inner wall surfaces of the pans, however, takes much time and labor. In addition, since the welded portions are in direct contact with the raw material liquid and so forth, any weld defect will result in liquid leakage.

On the contrary, when inserting the tension rods between the back surfaces of the first pan and the second pan and fixing their upper and lower ends respectively to the top and bottom frame members as described above, the top frame member can bear the load acting on the bottom frame member. This obviates the need for welding the individual ribs to the inner wall surfaces of the pans. Further, since the tension rods are arranged at locations where they are free from contact with the raw material liquid and so forth, even if defective welds are caused between the tension rods and the top or bottom frame member, there is no risk at all of the defective welds leading to liquid leakage.

An electrolyzer unit as set forth in claim 9 comprises a first pan, a plurality of first ribs electrically connected to a front surface of the first pan, a first electrode electrically connected to the respective ribs, a second pan, a plurality of second ribs electrically connected to a front surface of the second pan, and a second electrode electrically connected to the respective ribs, wherein a back surface of the first pan and a back surface of the second pan are electrically connected through clad plates. The unit is characterized in that the first ribs are formed by bending a plurality of cut portions provided in a first metal plate, the first electrode is formed integral with the first ribs by perforating a plurality of through-holes in a remaining portion of the metal plate, the second ribs are formed by bending a plurality of cut portions provided in a second metal plate, and the second electrode is formed integral with the second ribs by perforating a plurality of through-holes in a remaining portion of the metal plate.

As a result, the step of welding the respective ribs and the electrodes can be eliminated.

An electrolyzer unit as set forth in claim 10 comprises a first pan, a plurality of first ribs electrically connected to a front surface of the first pan, a first electrode electrically connected to the respective ribs, a second pan, a plurality of second ribs electrically connected to a front surface of the second pan, and a second electrode electrically connected to the respective ribs, wherein a back surface of the first pan and a back surface of the second pan are electrically connected through clad plates. The unit is characterized in that a capacitor type projection welding is used to make joints at least between the front surface of the first pan and the first ribs and between the front surface of the second pan and the second ribs.

As the respective parts are joined by capacitor type projection welding which can provide a strong joint strength with a relatively small thermal influence, it is possible to have an electrolyzer unit that ensures a required strength while at the same time keeping the overall thermal distortion quite small.

An electrolyzer unit as set forth in claim 11 comprises a first pan, a plurality of first ribs electrically connected to a front surface of the first pan, a first electrode electrically connected to the respective ribs, a second pan, a plurality of second ribs electrically connected to a front surface of the second pan, and a second electrode electrically connected to the respective ribs, wherein the first ribs and the second ribs each have liquid and gas passages and a back surface of the first pan and a back surface of the second pan are electrically connected through clad plates. The unit is characterized in that the first rib has a linear electrode contact portion in contact with the first electrode, a plurality of spacer portions projecting from the electrode contact portion like comb-teeth, spaces between the spacer portions, and pan contact portions formed by bending front ends of the respective spacer portions, and the second ribs have a linear electrode contact portion in contact with the second electrode, a plurality of spacer portions projecting from the electrode contact portion like comb-teeth, spaces between the spacer portions, and pan contact portions formed by bending front ends of the respective spacer portions.

Further, a rib for an electrolyzer unit as set forth in claim 12 is characterized by a linear electrode contact portion for contact with an electrode, a plurality of spacer portions projecting from the electrode contact portion like comb-teeth, spaces between the spacer portions, and pan contact portions formed by bending front ends of the respective spacer portions.

The spacer portions of each rib are formed like comb-teeth, and there are spaces between the spacer portions. With this structure, when the pan contact portions of the rib are welded to the front surface of the pan, the spaces between the spacer portions form gas/liquid passages, without purposely providing openings.

Further, when setting the width of each spacer portion almost equal to the width of each space between the spacer portions, the ribs can be cut from a blank plate very efficiently, as the spacer portions of one rib provide the spaces of another rib and the spacer portions of the other rib constitute the spaces of the one rib.

A welding method as set forth in claim 13 for joining together a first object, a second object and a third object, which are disposed one over another, comprises the steps of forming, on at least the first object, projections protruding on the second object side, bringing a first electrode into contact with a front surface of the first object at positions where the projections are formed, bringing a second electrode into engagement with a back surface of the third object, and while putting a predetermined pressure between the first and second electrodes, applying a DC voltage stored in a capacitor to them to realize a simultaneous welding between the projections of the first object and a front surface of the second object and between a back surface of the second object and a front surface of the third object.

By applying the first ribs to the first object, the first pan to the second object and the clad plates to the third object, the welding method described above can realize the simultaneous welding between "the front surface of the first pan and the first ribs" and between "the back surface of the first pan and one surface of the clad plates".

Further, by applying the second ribs to the first object, the second pan to the second object and the clad plates to the third object, the welding method can realize the simultaneous welding between "the front surface of the second pan and the second ribs" and between "the back surface of the second pan and the other surfaces of the clad plates".

According to this welding method, it becomes possible to simultaneously weld the ribs, the pan and the clad plates as described above, which are all main constitutional members of the electrolyzer unit (so-called a three-layer simultaneous welding). This not only enables simplification of the manufacturing process but also minimizes thermal distortions of the pans because of small thermal influences on the objects to be welded and has the ability of welding members of different thicknesses easily. It can be said therefore that the welding method is optimum for the manufacture of electrolyzer units.

This welding method itself, however, is not limited to the manufacture of electrolyzer units but is also applicable to other welding purposes.

A welding method as set forth in claim 14 for welding together a first object, a second object, a third object, a fourth object and a fifth object, which are placed one over another, comprises forming, on at least the first object, projections protruding on the second object side, bringing a first electrode into engagement with a front surface of the first object at positions where the projections are formed, bringing a second electrode into engagement with a back surface of the fifth object, and while putting a predetermined pressure applied on the first and second electrodes, applying a DC voltage stored in a capacitor to them to realize a simultaneous welding between the projections of the first object and a front surface of the second object, between a back surface of the second object and a front surface of the third object, between a back surface of the third object and a front surface of the fourth object, and between a back surface of the fourth object and a front surface of the fifth object.

By applying the first ribs to the first object, the first pan to the second object, the clad plates to the third object, the second pan to the fourth object and the second ribs to the fifth object, the simultaneous welding can be realized between "the front surface of the first pan and the first ribs", between "the back surface of the first pan and one surface of the clad plates", between "the front surface of the second pan and the other surfaces of the clad plates" and between "the back surface of the second pan and the second ribs".

This welding method enables the so-called five-layer simultaneous welding and can further simplify the electrolyzer unit manufacturing process.

This welding method, however, is also not limited to the manufacture of the electrolyzer unit but is applicable to other joining purposes.

A welding method as set forth in claim 15 for joining a first object, a second object, a third object, a fourth object and a fifth object, which are stacked in layers, comprises forming, on at least the first object, projections protruding on the second object side, forming on the fifth object projections protruding on the fourth object side, bringing a first electrode into engagement with a front surface of the first object at positions where the projections are formed, bringing a second electrode into engagement with a back surface of the fifth object at positions where the projections are formed, and while putting a predetermined pressure between the first and second electrodes, applying a DC voltage stored in a capacitor to them to realize a simultaneous welding between the projections of the first object and a front surface of the second object, between a back surface of the second object and a front surface of the third object, between a back surface of the third object and a front surface of the fourth object, and between a back surface of the fourth object and the projections of the fifth object.

Also in this case, by applying the first ribs to the first object, the first pan to the second object, the clad plates to the third object, the second pan to the fourth object and the second ribs to the fifth object, it becomes possible to realize the simultaneous welding between "the front surface of the first pan and the first ribs", between "the back surface of the first pan and one surface of the clad plates", between "the front surface of the second pan and the other surfaces of the clad plates" and between "the back surface of the second pan and the second ribs".

A welding method as set forth in claim 16 for welding together a first object, a second object, a third object and a fourth object, which are stacked in layers, comprises forming, on at least the first object, projections protruding on the second object side, bringing a first electrode into engagement with a front surface of the first object at positions where the projections are formed, bringing a second electrode into engagement with a back surface of the fourth object, and while putting a predetermined pressure between the first and second electrodes, applying a DC voltage stored in a capacitor to them to realize a simultaneous welding between the projections of the first object and a front surface of the second object, between a back surface of the second object and a front surface of the third object, and between a back surface of the third object and a front surface of the fourth object.

By applying the first ribs to the first object, the first pan to the second object, the clad plates to the third object and the second pan to the fourth object, the welding method can realize the simultaneous welding between "the front surface of the first pan and the first ribs", between "the back surface of the first pan and one surface of the clad plates" and between "the front surface of the second pan and the other surfaces of the clad plates".

According to this method, a so-called four-layer simultaneous welding is enabled. Depending on the construction of the electrolyzer unit, the provision of ribs on one pan may be omitted, and an electrode of porous metal or the like may be directly joined to the back surface of the pan. This welding method is effective in this case.

This welding method, however, is not limited to the manufacture of the electrolyzer unit but is applicable to other joining purposes.

A welding method as set forth in claim 17 is based on the welding method claimed in any one of claims 13–16 and comprises, when the second object and the third object are made of different materials, adjusting a voltage applied between the two electrodes to control an amount of the material of the third object melted into the second object.

For example, in the case where the third object to be welded is an iron layer of clad plates and the second object is a cathode pan of nickel, there is a risk that iron will be melted and penetrates so deeply into the nickel that the iron is precipitated on the surface of the cathode pan and reacts with alkali in the cathode chamber to cause corrosion.

Then, it is effective to control the amount of molten iron by adjusting the voltage applied between the first electrode and the second electrode.

Besides, when there is a fear that a reduction in the applied voltage may weaken the joint strength between the first object and the second object, the number, pitch and shape of the projections may be adjusted to ensure a required joint strength.

A welding method as set forth in claim 18 is based on the welding method as claimed in claim 15 and comprises the construction of the projections formed on the first object being differentiated from the construction of the projections formed on the fifth object.

For example, when the first object to be welded comprises cathode ribs of nickel, the second object is a cathode pan of nickel, the third object comprises clad plates with a nickel layer and a titanium layer, the fourth object is an anode pan of titanium, and the fifth object comprises anode ribs of titanium, then the optimum welding conditions on the nickel side and on the titanium side differ.

In such a case, the over-melting can be prevented by setting the applied voltage and the pressing force of the two electrodes to the values optimum for the titanium side where the welding is more difficult to accomplish, and by adjusting the number, shape, dimensions (height and diameter) and pitch of the projections on the nickel side.

A welding system as set forth in claim 1 comprises a welder, an XY stage for supporting a plurality of objects to be welded, which are stacked in layers, and moving them in the X and Y directions, control means for controlling an operation of the welder and the XY stage, and reverse straining means for applying a reverse strain to at least one of the objects in a direction opposite to the direction of strain caused by welding. The system is characterized in that the welder has a vertically movable upper electrode pressing the objects with a predetermined pressure, a vertically movable lower electrode, and a capacitor for supplying a weld current between the two electrodes, wherein the reverse straining means has a first engagement member and a second engagement member paired with the first engagement member, and the first engagement member and the second engagement member clamp the objects from both sides to curve the objects.

This welding system, because of having the reverse straining means as described above, can cancel thermal deformations produced during the welding process and is most suited for welding of the ribs, the pan and the clad plates of the electrolyzer unit.

Further, as the welder used is of a capacitor type, the three-layer simultaneous welding or the five-layer simultaneous welding is enabled by forming projections on the side of the object to be welded.

A welding system as set forth in claim 20 comprises forming at least one of the upper electrode and the lower electrode with a hollow portion, and providing water passages and a cooler for circulating and supplying cooling water in the hollow portion.

This allows the portions being welded to be cooled at the same time, thus effectively eliminating thermal distortions during the welding process.

BEST MODE FOR CARRYING OUT THE INVENTION

Figure 1:
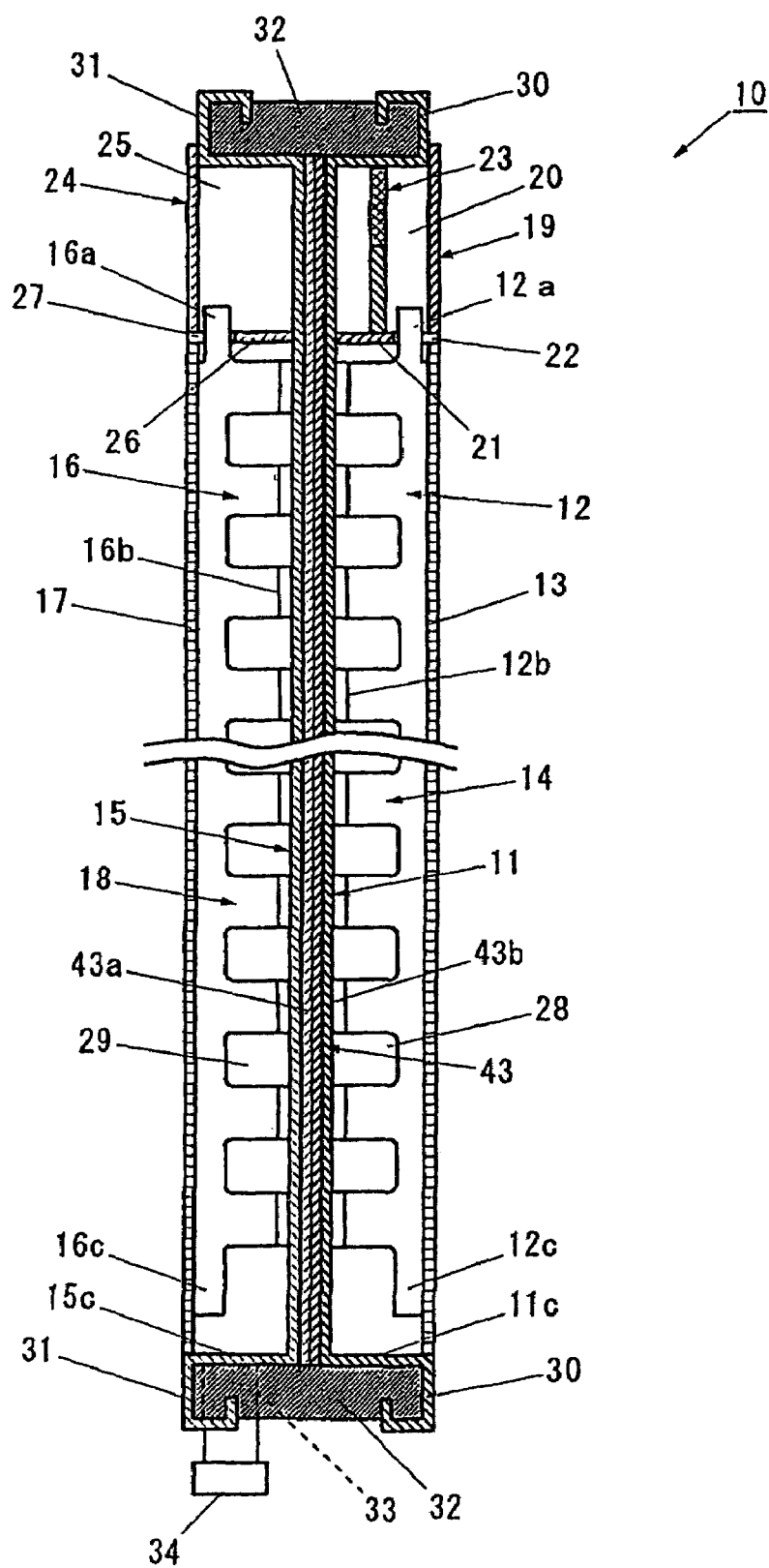
FIG. 1 is a schematic section view showing a bipolar electrolyzer according to the invention.

FIG. 1 is a schematic section view showing a bipolar electrolyzer unit 10 according to the invention.

This electrolyzer unit 10 has an anode chamber 14 which is formed by an anode pan 11 in a flat pan shape, anode ribs 12 arranged on the surface of the anode pan 11, and an anode 13 connected to end faces of the anode ribs 12. The anode pan 11, the anode ribs 12 and the anode 13 are all formed of titanium with an excellent corrosion resistance.

Also provided is a cathode chamber 18 which is formed by a cathode pan 15 in a flat pan shape, cathode ribs 16 arranged on the surface of the cathode pan 15, and a cathode 17 connected to end faces of the cathode ribs 16. The cathode pan 15, the cathode ribs 16 and the cathode 17 are all made from nickel or the like with an excellent alkali resistance.

Between the back surface of the cathode pan 15 and the back surface of the anode pan 11 are arranged clad plates 43, each of which is formed by joining together a titanium layer and a nickel layer through explosion bonding or rolling, with the titanium layers 43b welded to the anode pan 11 and the nickel layers 43a welded to the cathode pan 15.

At the top of the anode pan 11 is arranged a partition member 19 of titanium, L-shaped in cross section, which forms an anode-side gas-liquid separation member 20.

The partition member 19 has slits 22 in a horizontal surface 21 thereof to ensure a flow of liquid and gas into and from the anode chamber 14. Into these slits 22 are fitted front end projections 12a of the anode ribs 12.

A gas-liquid separation plate 23 is welded to the horizontal surface 21 of the partition member 19.

Also at the top of the cathode pan 15 is mounted a partition member 24 of nickel or the like, L-shaped in cross section, which forms a cathode-side gas-liquid separation chamber 25. The partition member 24 has slits 27 in a horizontal surface 26 thereof to ensure a flow of liquid and gas into and from the anode chamber 18. Into these slits 27 are fitted front end projections 16a of the cathode ribs 16.

The anode ribs 12 and the cathode ribs 16 are both formed with notched openings 28, 29 to ensure flows of the liquid and gas in transverse directions.

The anode pan 11 and the cathode pan 15 have at their periphery flange portions 30, 31 that are bent like a hook. In a space between the anode-side flange portions 30 and the cathode-side flange portions 31 are installed reinforcing frame members 32 of stainless steel or the like. When installed, the front ends of the flange portions 30, 31 engage grooves in the reinforcing frame members 32.

While FIG. 1 shows only two frame members 32, 32 at the top and bottom, two more frame members are actually provided on the left and right sides of the electrolyzer unit 10.

Among the frame members 32, the one installed at the bottom is formed with a through-hole 33 communicating with the cathode chamber 18, in which is installed a nozzle 34 for supplying a raw material.

Though not shown in the figure, the bottom frame member 32 is also formed with another through-hole communicating with the anode chamber 14, in which is installed a nozzle for supplying a raw material.

The frame members 32 at the top and bottom are also formed with through-holes for passing tension rods, which will be detailed later.

Next, referring to FIG. 2 through FIG. 8, a method of manufacturing the electrolyzer unit 10 will be described.

Figure 2:
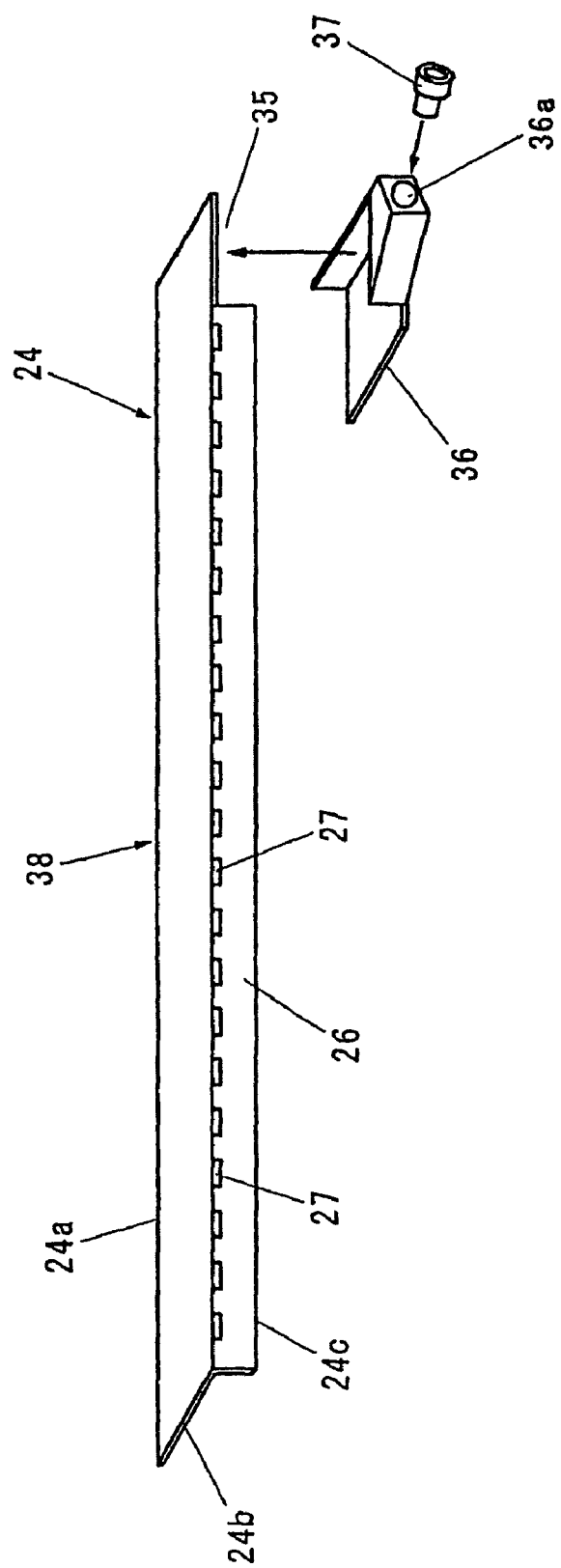
FIG. 2 is a perspective view showing a process of manufacturing a cathode-side gas-liquid separation unit.

First, as shown in FIG. 2, a notched portion 35 is formed in an end of the cathode-side partition member 24, L-shaped in cross section, and a discharge box 36 of nickel is TIG-welded at the notched portion. The discharge box 36 has a front-end opening 36a in which is installed a discharge nozzle 37 of nickel to form a cathode-side gas-liquid separation unit 38. This discharge box 36 is for discharging liquid and gas accumulated in the gas-liquid separation chamber 25 to the outside and needs to be connected airtight to the partition member 24.

The partition member 24 is formed with the plurality of slits 27 at equal intervals along its bending line beforehand.

Figure 3:
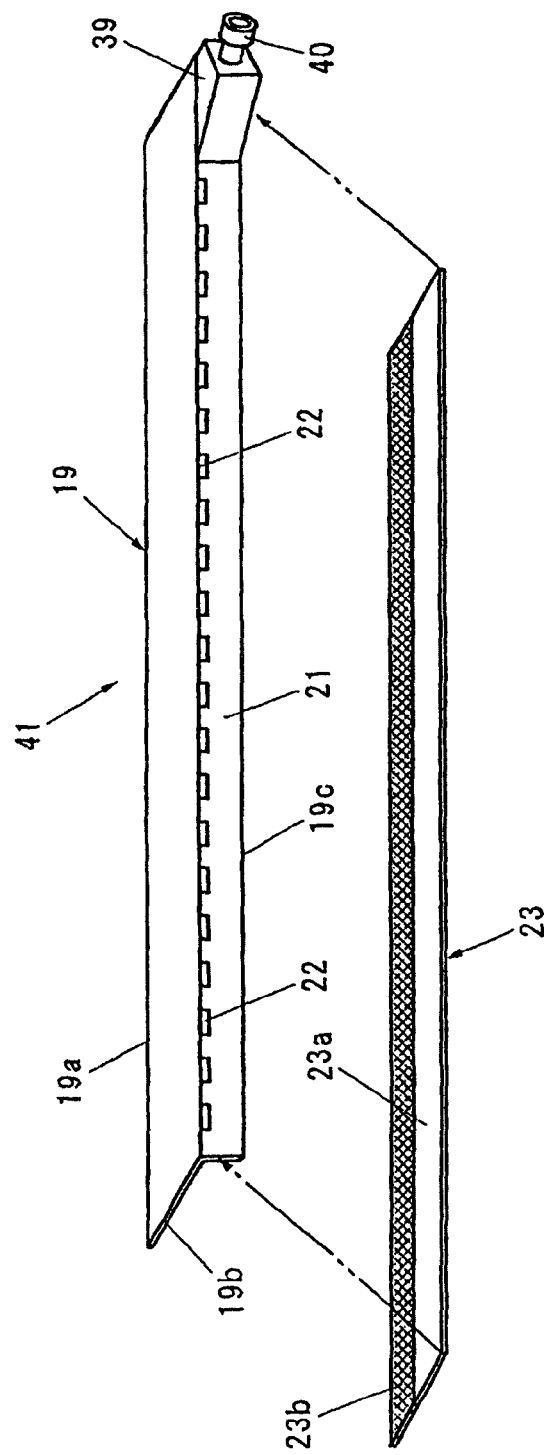
FIG. 3 is a perspective view showing a process of manufacturing an anode-side gas-liquid separation unit.

Further, as shown in FIG. 3, the anode-side partition member 19, L-shaped in cross section, has a notched portion formed at an end thereof, which is similar to the one described above, and a discharge box 39 of titanium is connected at the notched portion by TIG-welding. The discharge box 39 has a front-end opening in which is installed a discharge nozzle 40 of titanium to form an anode-side gas-liquid separation unit 41.

The partition member 19 is formed with the plurality of slits 22 at equal intervals along its bending line beforehand.

The gas-liquid separation plate 23 is welded to the horizontal surface 21 of the anode-side gas-liquid separation unit 41. The gas-liquid separation plate 23 is formed by joining a titanium plate 23a and a titanium porous metal 23b.

Figure 4:
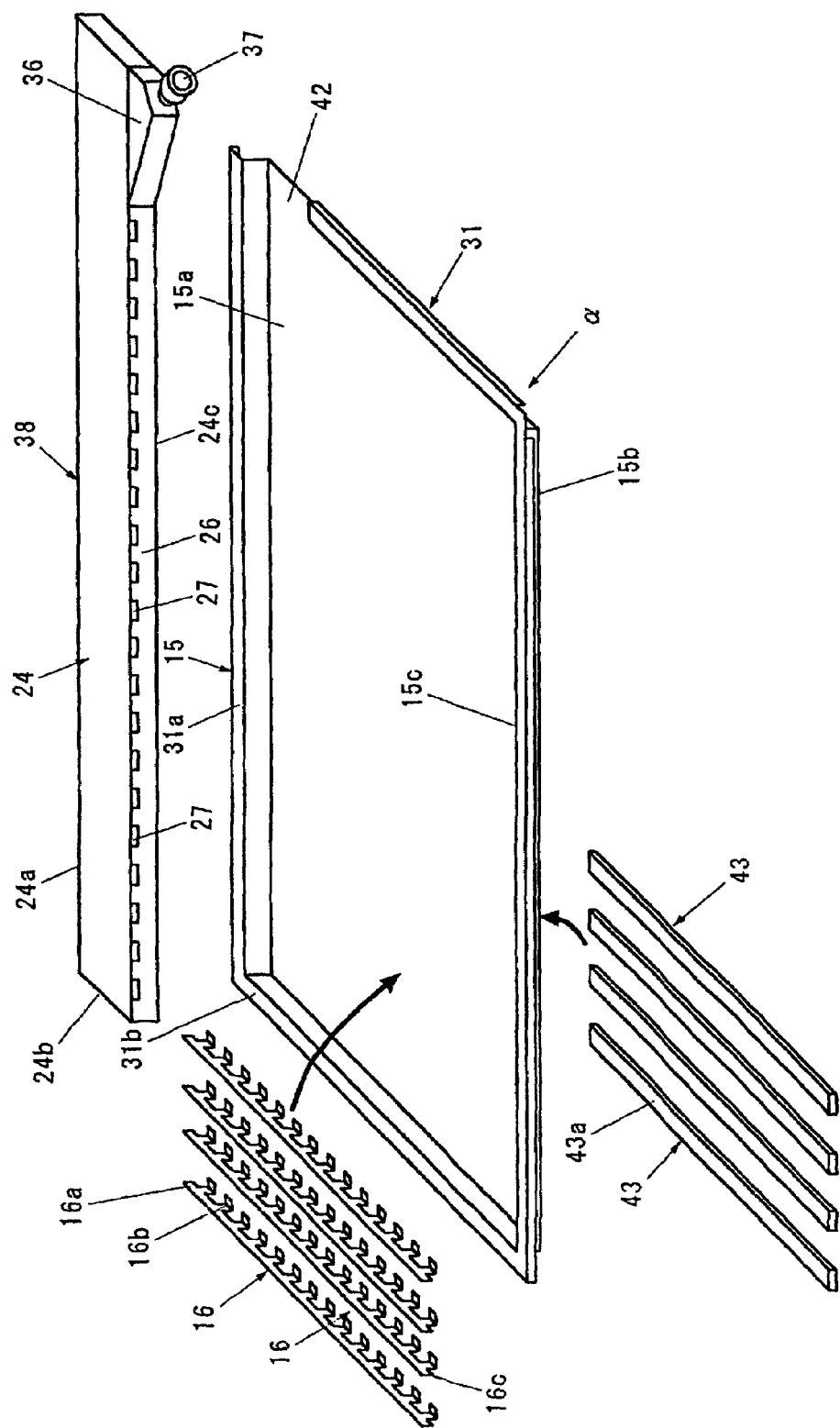
FIG. 4 is a perspective view showing the manner how the cathode-side gas-liquid separation unit and cathode ribs are arranged on the surface of the cathode pan and also how clad plates are arranged on the back surface side.

Next, as shown in FIG. 4, a nickel plate is cut into a predetermined shape and then subjected to necessary bending and pressing processes. The nickel plate is then subjected to TIG-welding at its three corners to form the cathode pan 15 that has at its periphery the flange portions 31 bent like a hook.

The cathode pan 15 may have a size of 2.4 m width, 1.2 m length and 3 cm depth for instance.

In one of the flange portions 31 a notched portion 42 is formed.

First, the cathode-side gas-liquid separation unit 38 is joined to the surface of the cathode pan 15. At this time, the cathode-side gas-liquid separation unit 38 is positioned so that its discharge box 36 protrudes out of the notched portion 42.

Then, a top side 24a and a left side 24b of the partition member 24 are TIG-welded to the top-side flange portion 31a and the left-side flange portion 31b of the cathode pan 15. At this time, a bottom side 24c of the partition member 24 is left in contact with a surface 15a of the cathode pan 15 without being welded thereto.

After welding, the top-side flange portion 31a and the left-side flange portion 31b of the cathode pan 15 are checked from the back side to find any cracks or holes due to the welding.

Next, the plurality of clad plates 43 are arranged at predetermined intervals on the back surface 15b of the cathode pan 15. On the front surface 15a the same number of cathode ribs 16 as that of the clad plates 43 are arranged at predetermined intervals. The so-called capacitor type projection welding is performed between pan contact portions 16b of the cathode ribs 16 and the front surface 15a of the cathode pan 15 and between the back surface 15b of the cathode pan 15 and the nickel layers 43a of the clad plates 43 to join them.

Figure 5:
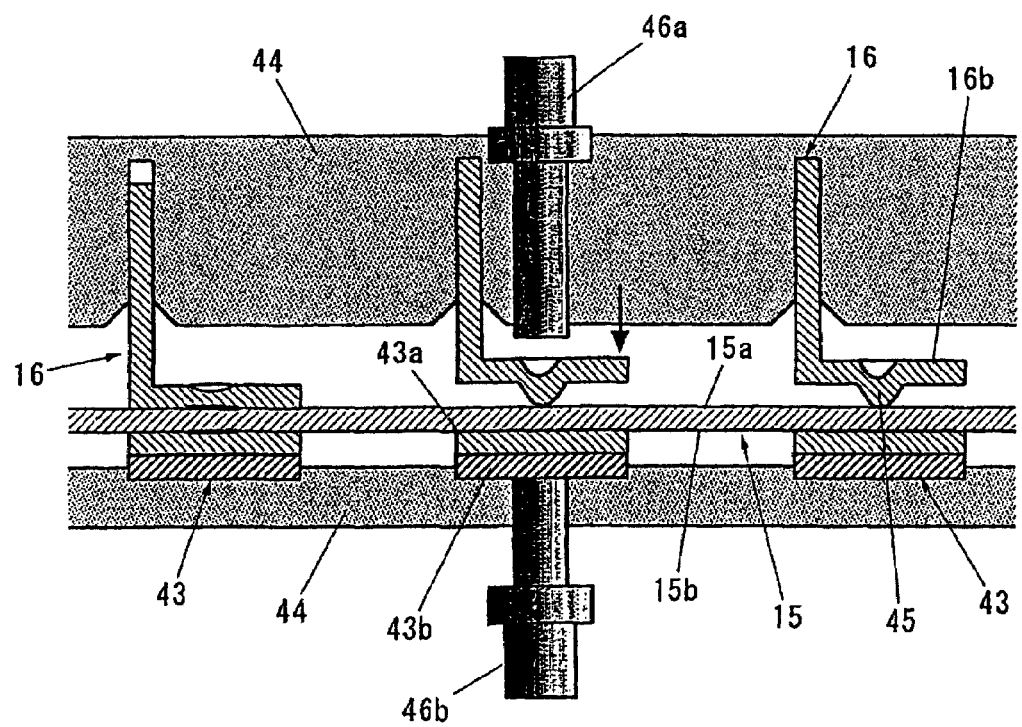
FIG. 5 is an enlarged, partial section view showing the manner how the cathode ribs and the surface of the cathode pan are joined and how the back surface of the cathode pan and the nickel layer of the clad plates are joined.

FIG. 5 is an enlarged view for showing the capacitor type projection welding process, in which is depicted the manner how the clad plates 43 are arrayed and positioned on the back surface 15b of the cathode pan 15 and the cathode ribs 16 are arrayed and positioned on the front surface 15a through an array jig 44.

The pan contact portions 16b of each cathode rib 16 have projections 45 protruding on the front surface side 15a of the cathode pan 15, which are formed in advance by stamping. The respective projections 45 and the nickel layer 43a of one clad plate 43 are arranged at positions opposing each other with the wall of cathode pan 15 interposed therebetween. The titanium layer 43b of the clad plate 43 is engaged with the front end face of a lower electrode 46b.

In this state, an upper electrode 46a of a capacitor type welder is lowered to press against the pan contact portion 16b of the cathode rib 16 with a predetermined pressure, while the welder is energized. Joule heat, due to contact resistance between the projection 45 and the cathode pan, and the applied pressure, causes the projection 45 to melt instantaneously, completing the welding between the pan contact portion 16b of the cathode rib and the front surface 15a of the cathode pan. At the same time, the nickel layer 43a of the clad plate 43 and the back surface 15b of the cathode pan are fused together due to the heat caused by the contact resistance.

In contrast to a general AC spot welder which uses a step-up transformer to generate a high voltage during a predetermined period of energization to accomplish welding, the capacitor type welder has a provision for instantaneously applying a large current, stored in the capacitor, and can locally heat a material in a very short time, thus achieving an efficient welding.

Further, another advantage of the capacitor type welder is that a shunt current (a phenomenon in which a current leaks through portions that have already been welded and whose electric resistances have decreased, thereby preventing an effective resistance welding) does not easily occur, assuring a stable current flow, which in turn results in a uniform weld quality.

Further, the method of forming a projection in the material to be welded as described above and collapsing the projection by heat produced during the welding and by a pressure applied from a flat-end electrode to achieve welding is called a "projection welding."

This projection welding performed with the capacitor type welder makes it possible to complete the "welding between the pan contact portion 16b of the cathode rib and the front surface 15a of the cathode pan" and the "welding between the back surface 15b of the cathode pan and the nickel layers 43a of the clad plates 43" simultaneously with a single welding action, as described above.

Further, the method has an advantage that since the heating occurs locally and instantaneously, thermal effects on other parts are less and thermal strains of the cathode pan 15 can be minimized. Another advantage is that the welding of multiple points at a relatively narrow pitch becomes possible because of the decreased influences of shunt currents.

In fact, it has been not impossible to simultaneously weld multiple layers by the conventional AC spot welding.

However, the pan contact portions 16b of the cathode ribs, the cathode pan 15 and the clad plates 43 have different thicknesses, and the simultaneous welding of these components requires a welding current to be applied for a predetermined duration. The thermal influence caused by the welding current applied for the predetermined duration strains the cathode pan 15 intensively, requiring significant corrections to be made after the welding. This makes it practically impossible to adopt the conventional AC spot welding for multilayer welding.

Further, in the case where the clad plates 43 are made of iron and the cathode pan 15 of nickel, another problem arises that the large voltage application can result in an over-melting and therefore a deteriorated weld quality, although this problem is not so salient when the materials of the clad plates 43 and the cathode pan 15 are the same.

Figure 6:
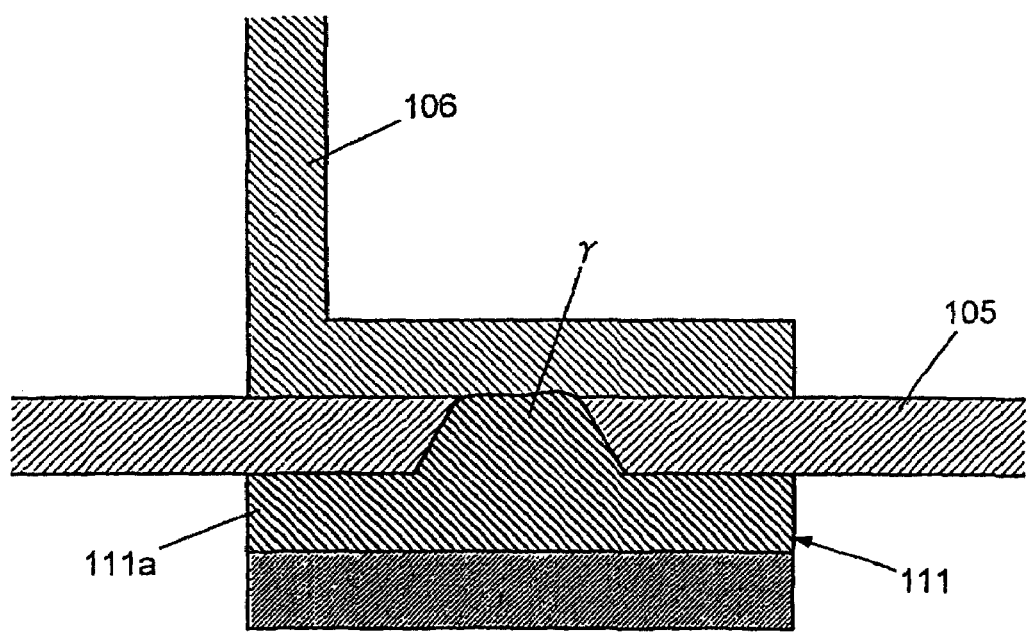
FIG. 6 is an enlarged section view showing the manner how an over-melting occurs on the clad plate metal due to a large voltage application during an AC spot welding.

More specifically, as shown in the enlarged view of FIG. 6, when a high voltage is applied to effect a spot welding between "an iron layer 111a of a clad plate 111 and a cathode pan 105" and a spot welding between "the cathode pan 105 and a cathode rib 106", iron y of the clad plates 111 penetrates deep into the cathode pan 105. If the cathode pan 105 is thin, a part of the iron y precipitates at the front surface of the cathode pan 105. This iron comes into contact with a strong alkaline environment in the cathode chamber 108 and corrodes, leading to a liquid leakage.

Although the problem of degraded durability due to over-melting can of course be overcome by using the clad plate 111 that has a nickel layer 110 with an excellent alkali resistance as described above, there still is a demand for using the clad plate 111 having the iron layer 111*a* in view of the cost.

Concerning this demand, the above-described problem can be dissolved through the use of the capacitor type welder and the formation of the projections 45 on the pan contact portions 16*b* of the cathode ribs.

That is, by applying a pressing force and a large weld current to the projections 45 instantaneously, the cathode ribs 16 and the cathode pan 15 of largely different thicknesses can be welded reliably.

Figure 7:
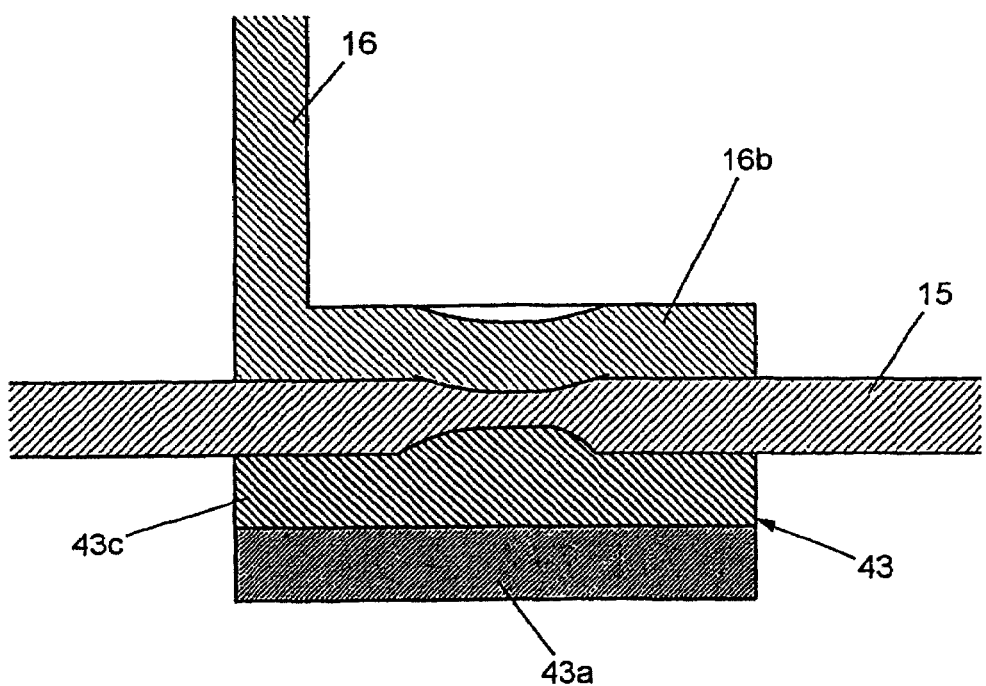
FIG. 7 is an enlarged sectional view showing the manner how the amount of melting of the clad plate metal is controlled by a capacitor type projection welding.

Further, as a result of keeping the voltage applied to the capacitor relatively low, the amount of the iron layer 111*c* of the clad plate 43 that melts into the cathode pan 15 can be minimized, as shown in FIG. 7.

For example, in the case where the wall of the cathode pan was 1.0 mm thick, the pan contact portions 16*b* of the cathode ribs were 1.5 mm thick and the iron layers of the clad plates 43 were 3.3 mm thick, welding was done with an electrode-to-electrode pressure set to 500–1000 kgf, the voltage to 200–500 V and the current to 30–60 kA. The welding could ensure a tensile strength of about 600 kg, higher than the base material's strength, at each welded point and realize a sufficient welding strength for the electrolyzer unit.

The projections 45 may be formed into elliptical, oval and rectangular shapes as well as a circular shape. When it is formed in a circular shape, the projection may be 3 mm across and 0.8 mm high for instance.

As to the number of the projections 45 formed on each pan contact portion 16*b* of the cathode rib, although there is no limitation, it is preferred that two projections be formed 10 mm apart for instance.

With the welding between the cathode ribs 16, the cathode pan 15 and the clad plates 43 completed, a cathode-side module α is obtained.

When the cathode ribs 16 are placed on the front surface 15*a* of the cathode pan, the front end projection 16*a* of each cathode rib 16 is inserted into the corresponding slit 27 of the gas-liquid separation unit 38 to engage the inner surface of the slit 27 (see FIG. 1). In this condition, the cathode ribs 16 are welded and fixed to the cathode pan 15, so that the gas-liquid separation unit 38 is pressed against the front surface 15*a* of the cathode pan by the large number of cathode ribs 16. Therefore, although the bottom side 24*c* of the partition member is not welded to the front surface 15*a* of the cathode pan as described above, it is possible to ensure a sufficient strength.

Further, rear end portions 16*c* of the cathode ribs 16 and an inner wall surface 15*c* of the cathode pan 15 are not welded and a predetermined gap is formed between them. What is meant by this structure will be described later.

Figure 8:
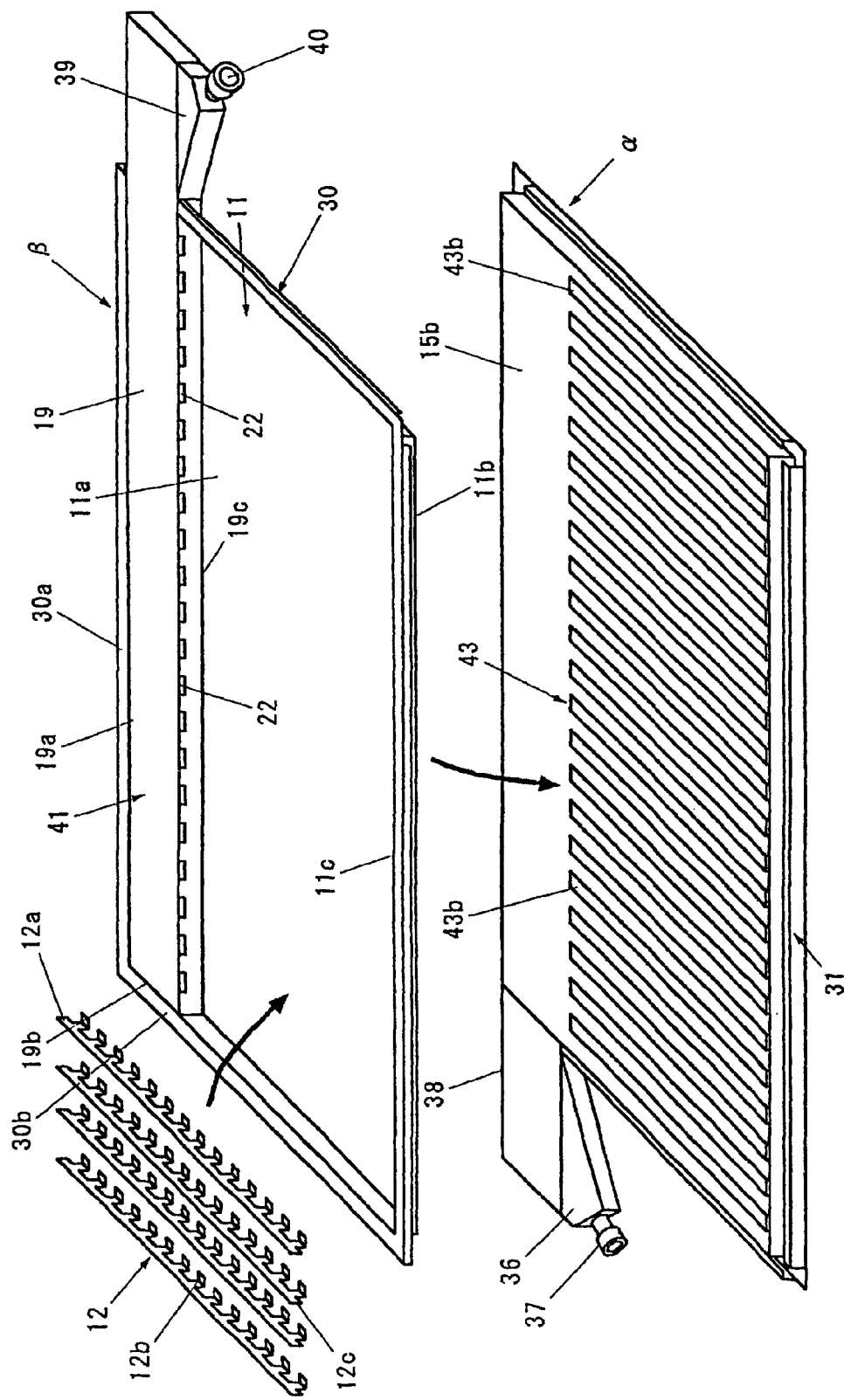
FIG. 8 is a perspective view showing the manner how the anode-side gas-liquid separation unit and anode ribs are arranged on the surface of the anode pan and also how the back surface of the anode pan is placed over the back surface of the cathode pan.

Next, as shown in FIG. 8, a titanium plate is cut into a predetermined shape and then subjected to necessary bending processes. The shaped titanium plate is then TIG-welded at its three corners to form the anode pan 11 that has at its periphery the flange portions 30 bent like a hook.

The anode pan 11 may measure 2.4 m wide by 1.2 m long by 3 cm deep for instance.

One of the flange portions 30 is formed with the notched portion.

Welding the anode-side gas-liquid separation unit 41 of FIG. 3 to a front surface 11*a* of the anode pan 11 forms an anode-side module β.

At this time, the anode-side gas-liquid separation unit 41 is positioned so that its discharge box 39 protrudes out of the notched portion.

Then, a top side 19*a* and a left side 19*b* of the partition member 19 are TIG-welded to a top-side flange portion 30*a* and a left-side flange portion 30*b* of the anode pan 11. At this time, a bottom side 19*c* of the partition member 19 is left in contact with the front surface 11*a* of the anode pan without being welded thereto.

After welding, the top-side flange portion 30*a* and the left-side flange portion 30*b* of the anode pan 11 are checked from the back side to detect any cracks or holes caused by the welding.

Next, the anode-side module β and the cathode-side module α are joined together. First, the cathode-side module α is turned over as shown in the figure and the back surface 11*b* of the anode pan is put over the back surface 15*b* of the cathode pan.

Then, the same number of anode ribs 12 as that of the clad plates 43 are arranged at predetermined intervals on the front surface 11*a* of the anode pan. The pan contact portions 12*b* of the anode ribs are welded to the front surface 11*a* of the anode pan, and the back surface 11*b* of the anode pan is welded to the titanium layers 43*b* of the clad plates by the capacitor type projection welding described above.

Figure 9:
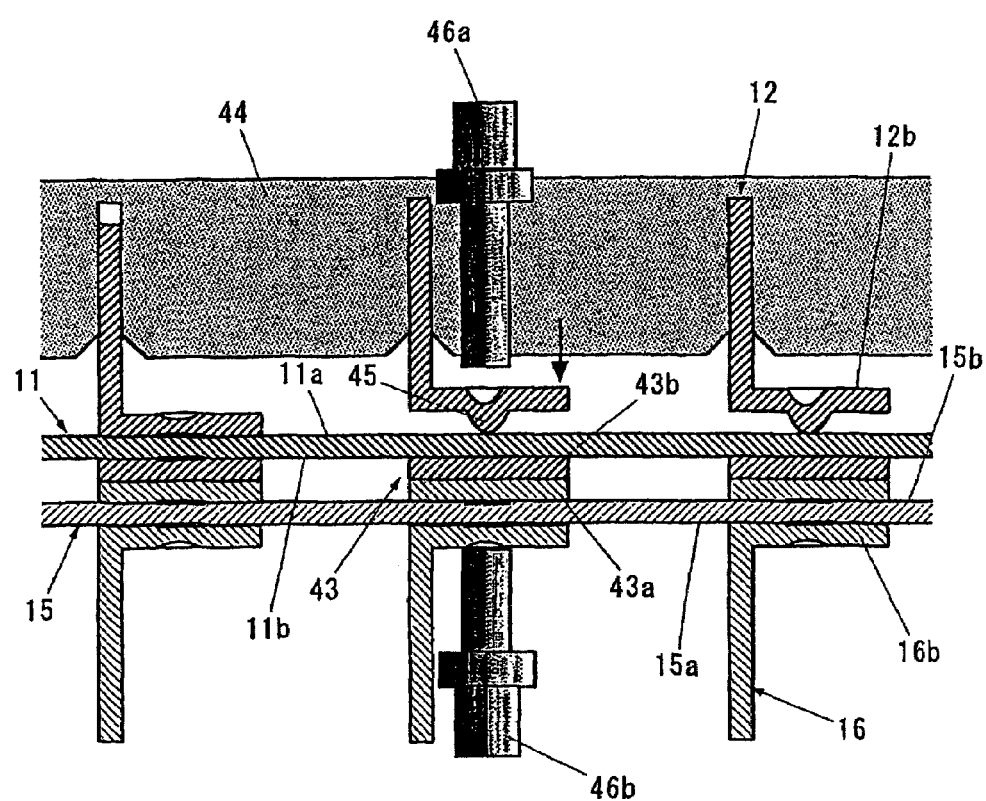
FIG. 9 is an enlarged, partial section view showing the manner how the anode ribs are joined to the surface of the anode pan and how the back surface of the anode pan is joined to the titanium layer of the clad plates.

FIG. 9 is an enlarged view showing the capacitor type projection welding process, in which is depicted the manner how the anode ribs 12 are arrayed and positioned on the front surface 11*a* of the anode pan through the array jig 44.

The pan contact portions 12*b* of each anode rib have projections 45 protruding on the front surface side 11*a* of the anode pan, which have been formed in advance by stamping. The respective projections 45 and the titanium layer 43*b* of one clad plate are arranged at positions opposing each other with the wall of the anode pan 11 interposed therebetween. The pan contact portion 16*b* of the cathode rib is engaged with the front end face of the lower electrode 46*b*.

In this condition, the upper electrode 46*a* of the capacitor type welder is lowered and energized while being pressed with a predetermined pressure, so that the projection 45 is instantaneously melted to complete welding between the pan contact portion 12*b* of the anode rib and the front surface 11*a* of the anode pan. At the same time also completed is welding between the titanium layer 43*b* of the clad plate 43 and the back surface 11*b* of the anode pan.

When the anode ribs 12 are placed on the front surface 11*a* of the anode pan, the front end projection 12*a* of each anode rib is inserted into the corresponding slit 22 of the gas-liquid separation unit 41 to engage the inner surface of the slit 22 (see FIG. 1). In this condition, the anode ribs 12 are welded and fixed to the anode pan 11, so that the gas-liquid separation unit 41 is pressed against the front surface of the anode pan 11 by the large number of anode ribs 12. Therefore, although the bottom side 19*c* of the partition member is not welded to the front surface 11*a* of the anode pan as described above, it is possible to ensure a sufficient strength.

Further, as in the case with the cathode side, rear end portions 12*c* of the anode ribs and an inner wall surface 11*c* of the anode pan 11 are not welded and a predetermined gap is formed between them.

Figure 10:
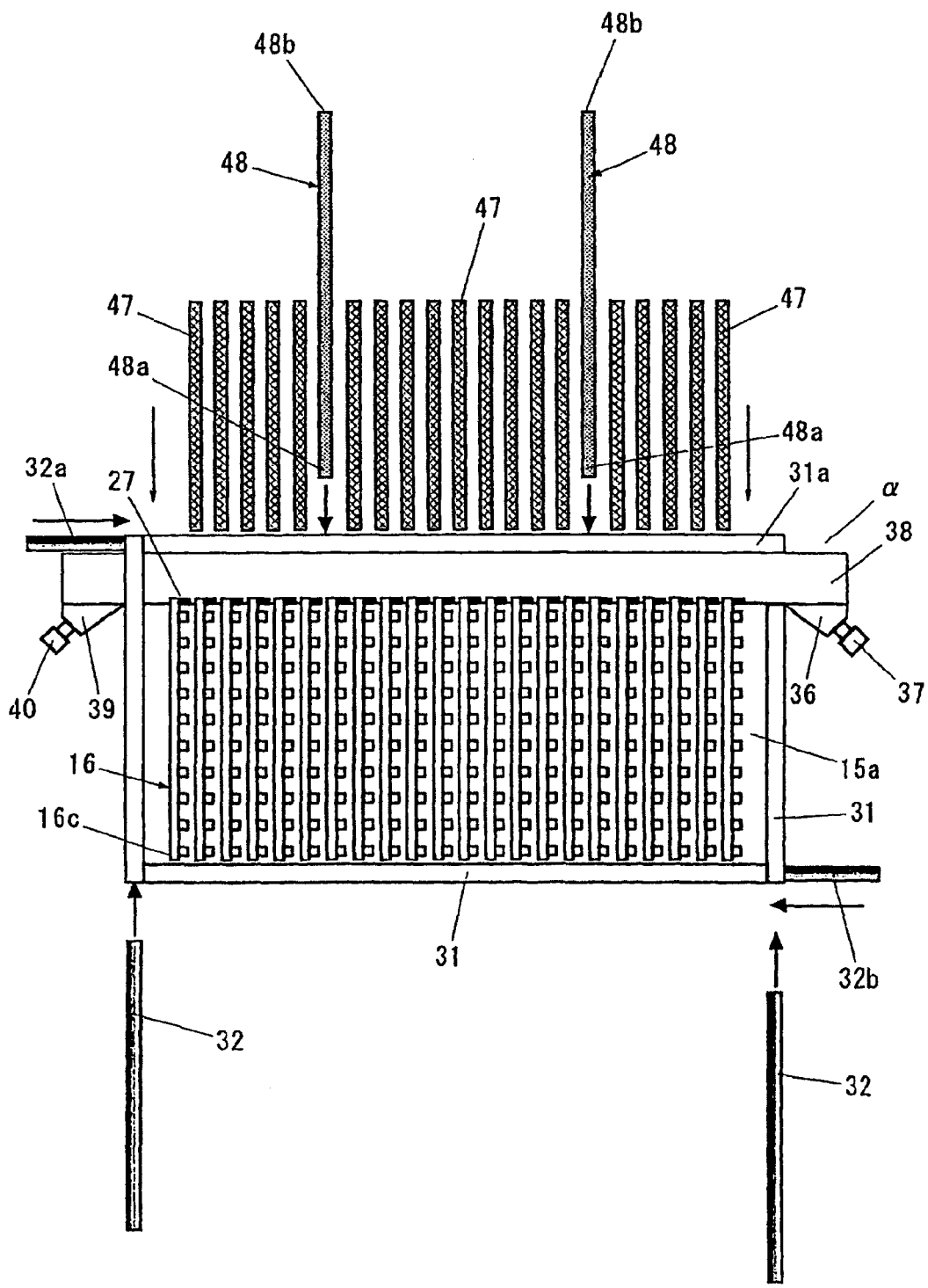
FIG. 10 is a plan view showing the manner how reinforcement members are inserted between the back surface of the cathode pan and the back surface of the anode pan, then bar-like frame members are successively inserted between flange portions of the two pans along their four sides, and then tension rods are passed between the top frame member and the bottom frame member.

Next, as shown in FIG. 10, a plurality of reinforcement members 47 of porous metal or the like are inserted between the back surface of the cathode pan 15 and the back surface of the anode pan 11. That is, between the back surface of the cathode pan 15 and the back surface of the anode pan 11 there are spaces where the clad plates 43 are not installed (gaps between the clad plates 43).

The reinforcement members 47 having an almost equal thickness to the clad plates 43 are slidingly inserted from above or below into these spaces.

It is noted, however, that the reinforcement members 47 are not inserted into all of the spaces and that some of the spaces are left unloaded for accommodating the tension rods which will be described later.

Next, as shown in the figure, the four rod-like frame members 32 are inserted successively between the flange portions 30 and 31 of the anode pan 11 and the cathode pan 15 along their four sides to securely join the cathode-side module α and the anode-side module β.

Figure 11:
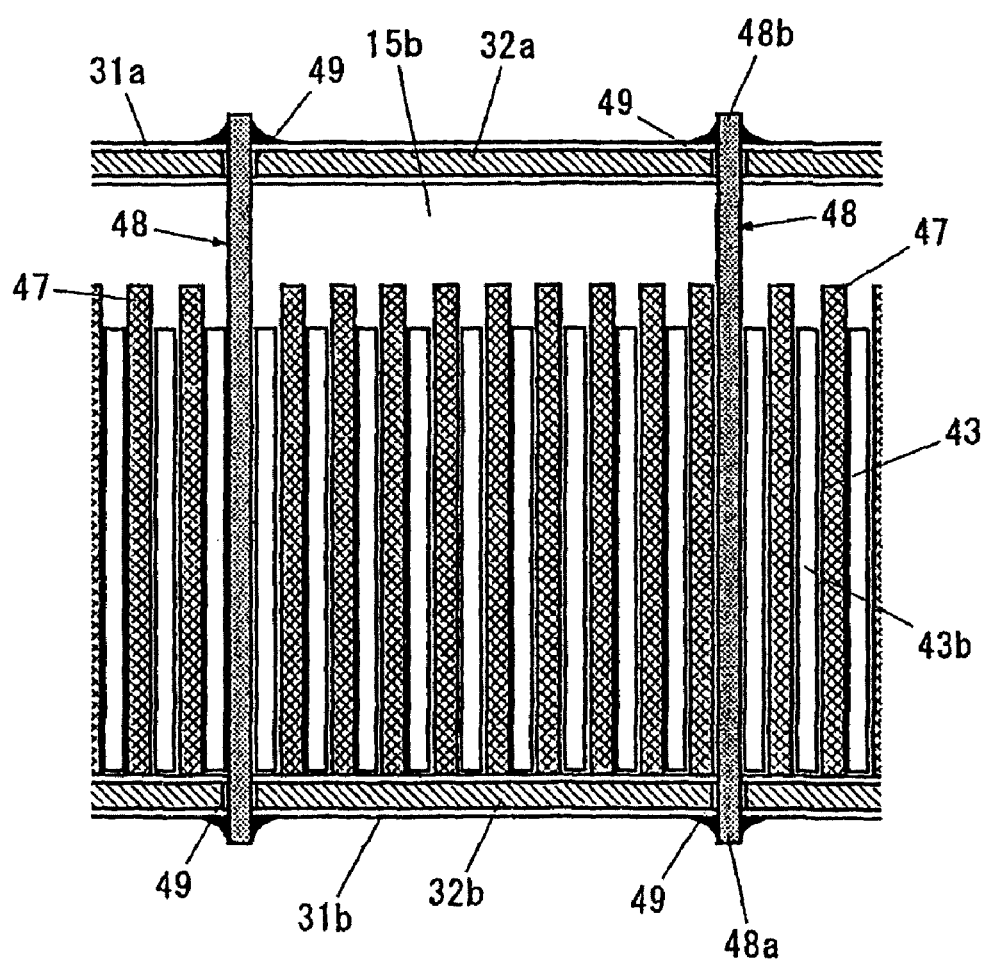
FIG. 11 is a partial section view showing a positional relation between the clad plates, the reinforcement members and the tension rods on the back surface of the cathode pan.

Among the four frame members 32, the top frame member 32a and the bottom frame member 32b are each formed with two through-holes 49 for passing the tension rods 48, as shown in FIG. 11.

Then, after the frame members 32 are installed, the two tension rods 48 are inserted from the through-holes 49 of the top frame member 32a (FIG. 10), and the lower ends 48a of the tension rods 48 are led out through the bottom frame member 32b. The upper ends 48b of the tension rods 48 remain projected out of the top frame member 32a. Then, the upper ends 48b and the lower ends 48a of the tension rods are TIG-welded to the top frame member 32a and the bottom frame member 32b.

The tension rods 48 are square bars of a metal material such as stainless steel or the like, which has a thickness that is almost equal to the thickness of the clad plates 43 and the reinforcement members 47. They are inserted into the vacant spaces between the back surfaces of the cathode pan 15 and the anode pan 11 (where the clad plates 43 and the reinforcement members 47 are not disposed).

Conventionally, since the frame members 32 are inserted before joining together the cathode pan 15 and the anode pan 11 through the clad plates 43, the individual reinforcement members 47 are TIG-welded to the back surface 15b of the cathode pan in order to prevent the reinforcement members 47 from shifting out of their positions when the frame members 32 are inserted.

In this invention, on the contrary, since the back surface 15b of the cathode pan and the back surface 11b of the anode pan are welded together through the clad plates 43 before inserting the frame members 32 as described above, it becomes structurally possible to insert the reinforcement members 47 into the narrow spaces between the back surface 15b of the cathode pan and the back surface 11b of the anode pan, thus minimizing the welding process.

That is, as apparent also from FIG. 11, the clad plates 43 and the tension rods 48 are arranged on the left and right sides of each reinforcement member 47, and the frame members 32 are finally arranged on the top and bottom sides of these reinforcement members 47, so that the reinforcement members 47 will not shift significantly out of their positions even if they are not securely fixed by welding.

The reinforcement members 47 are intended to prevent the cathode pan 15 and the anode pan 11 from being deformed by the pressure applied to their surfaces. During the operation of the electrolyzer, the reinforcement members 47 are in a condition of being pressurized, and there is no fear that they will move out of their place.

All the frame members 32 do not have to be loaded after the insertion of the reinforcement members 47 is completed as described above. For example, some frame members 32 may be loaded beforehand and, after the reinforcement members 47 are inserted from the top side or bottom side, the remaining frame members 32 may be loaded.

The bottom frame member 32b is supported in the direction of the top frame member 32a by the tension rods 48. Accordingly, when a liquid to be processed is supplied into the cathode chamber 18 and the anode chamber 14 during the operation of the analyzer to cause a downward load due to its weight, it is possible to effectively prevent the bottom frame member 32b from being curvedly deformed.

A conventional structure is such that the lower end portions of the cathode ribs and anode ribs are TIG-welded to the inner wall surfaces of the cathode pan and anode pan to support the load by the cathode and anode ribs. This results in a very large number of welding portions, which in turn raises a serious risk of liquid leakage due to welding failures as well as the problem of the longer time it takes to manufacture the unit.

In contrast, the use of the tension rods 48 eliminates the need for welding the rear end portions 16c of the cathode ribs and the rear end portions 12c of the anode ribs to the inner wall surface 15c of the cathode pan and the inner wall surface 11c of the anode pan, respectively, substantially reducing the number of welding portions and completely suppressing the possibility of liquid leakage due to welding failure.

Figure 12:
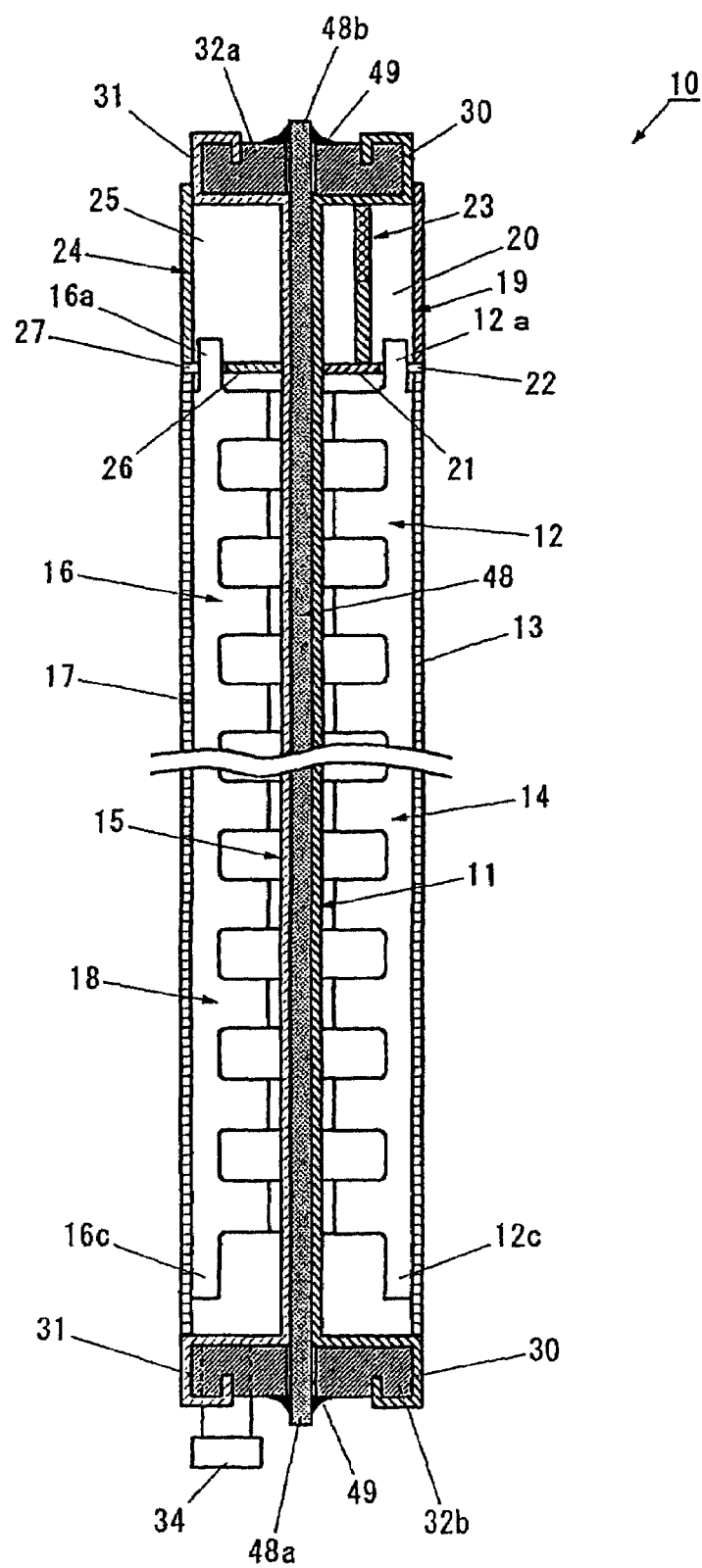
FIG. 12 is a schematic section view showing a positional relation of the tension rods disposed between the back surfaces of the cathode pan and the anode pan.

That is, as shown in FIG. 12, the tension rods 48 are inserted in the spaces in the electrolyzer unit 10 between the back surface 15b of the cathode pan and the back surface 11b of the anode pan 11, into which the liquid does not enter at all. Hence, even if there are faulty welds at the upper ends 48b or lower ends 48a of the tension rods 48, the electrolyzer unit is free from liquid leakage.

The number of the tension rods 48 is not limited to two but may be increased or decreased according to the size of the electrolyzer unit 10 or the material and thickness of the tension rods 48.

Figure 13:
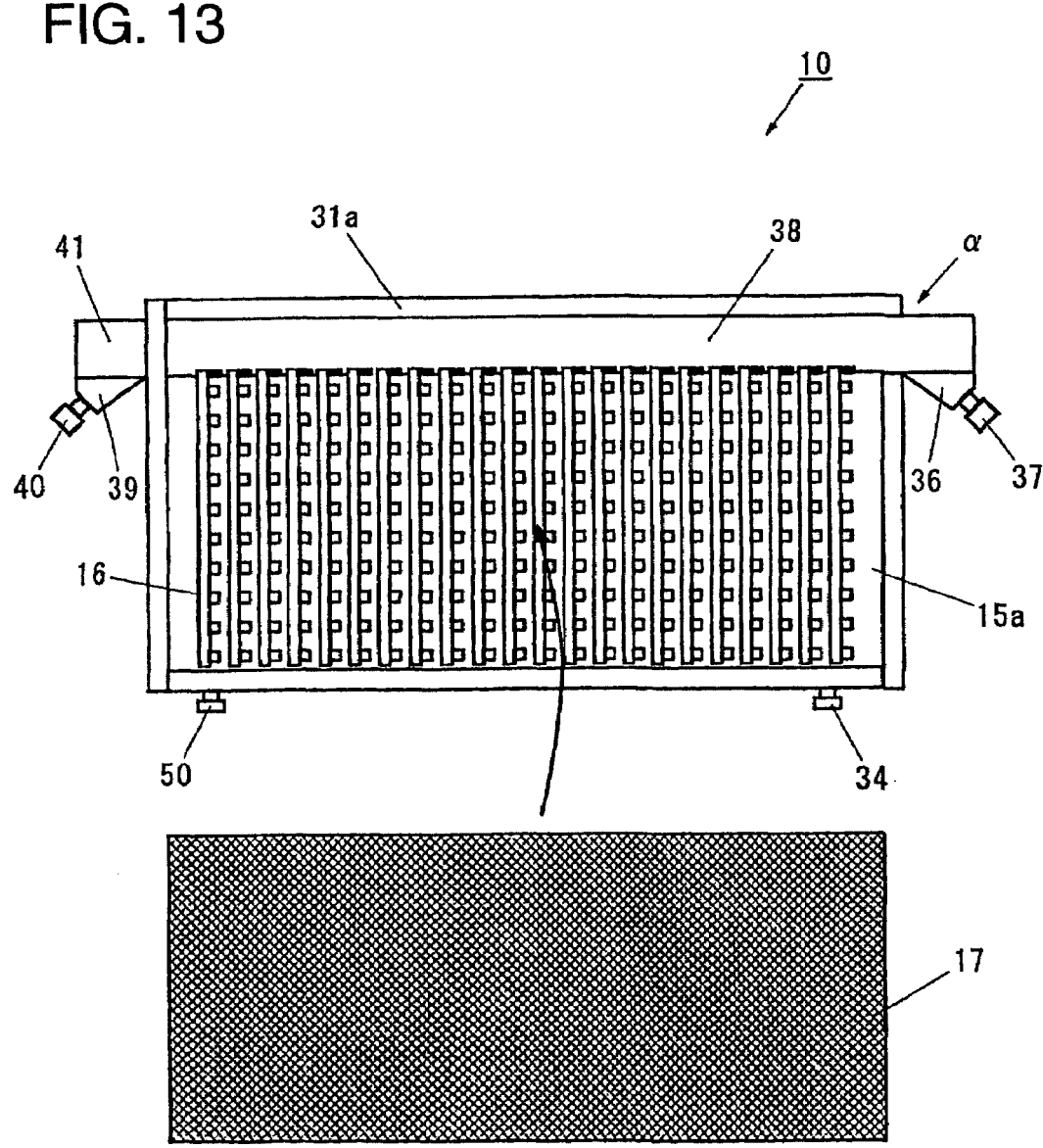
FIG. 13 is a plan view showing the manner how the cathode is mounted on the end faces of the cathode ribs.

In a final step, as shown in FIG. 13, the cathode 17 of nickel expanded metal is welded to the end faces of the cathode ribs 16, and at the same time the anode 13 of titanium expanded metal is welded to the end faces of the anode ribs 12. Further, the cathode-side nozzle 34 and the anode-side nozzle 50 are connected to the through-holes of the bottom frame member 32b, and the electrolyzer unit 10 is thus completed.

In the above, description has been made on the example where the welding between "cathode ribs 16, cathode pan 15 and clad plates 43 (nickel layers 43a)" (3-layer simultaneous welding) and the welding between "anode ribs 12, anode pan 11 and clad plates 43 (titanium layers 43b)" (3-layer simultaneous welding) are performed separately. The capacitor type projection welding may be used to perform welding between "cathode ribs 16, cathode pan 15, clad plates 43, anode pan 11 and anode ribs 12" (5-layer simultaneous welding).

Figure 14:
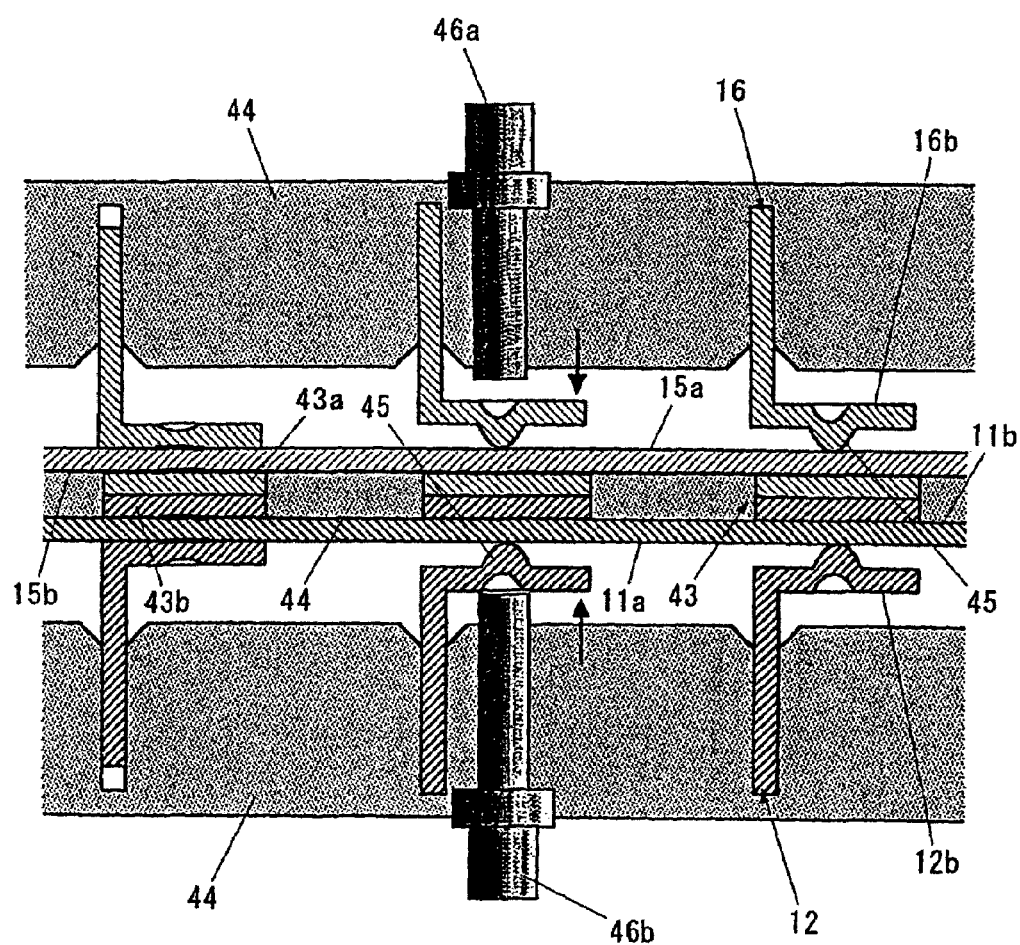
FIG. 14 is an enlarged, partial section view showing the manner how the cathode ribs, the cathode pan, the clad plates, the anode pan and the anode ribs are joined together.

More specifically, as shown in FIG. 14, the array jig 44 is used to array the cathode ribs 16 on the front surface 15a of the cathode pan, the anode ribs 12 on the front surface 11a of the anode pan, and the clad plates 43 between the cathode pan 15 and the anode pan 11.

It is noted that the pan contact portions 16b of the cathode ribs, the clad plates 43 and the pan contact portions 12b of the anode ribs are arranged at positions such that they oppose each other with the cathode pan 15 and the anode pan 11 interposed therebetween.

The pan contact portions 16b of the cathode ribs and the pan contact portions 12b of the anode ribs are formed with projection 45 by stamping. Though not shown in the figure, the clad plates 43 may also be formed with projections if necessary. The pan contact portion 12b of one anode rib is engaged with the front end face of the lower electrode 46b.

In this condition, the upper electrode 46a of the capacitor type welder is lowered and energized while being pressed against the pan contact portion 16b of the corresponding cathode rib with a predetermined pressure, and then the respective projections 45 melt instantaneously, performing at once the welding between the pan contact portion 16b of the cathode rib and the front surface 15a of the cathode pan, the welding between the back surface 15b of the cathode pan and the nickel layer 43a of the clad plate, the welding between the titanium layer 43b of the clad plate and the back surface 11b of the anode pan, and the welding between the front surface 11a of the anode pan and the pan contact portion 12b of the anode rib.

Examples of the 5-layer simultaneous welding are given below.

EXAMPLE 1

(1) Construction of Cathode Rib
    Material→Nickel
    Thickness→1.5 mm
    Number of projections→One per pan contact portion
    Height of projections→0.8 mm
    Diameter of projections→7.0 mm (2) Construction of Cathode Pan
    Material→Nickel
    Thickness→1.0 mm (3) Construction of Clad Plate
    Material→Nickel layer+titanium layer
    Thickness of nickel layer→1.0 mm
    Thickness of titanium layer→1.0 mm (4) Construction of Anode Pan
    Material→Titanium
    Thickness→1.0 mm (5) Construction of Anode Rib
    Material→Titanium
    Thickness→1.5 mm
    Number of projections→Zero per pan contact portion (6) Welding Condition
    Weld voltage→360 V
    Pressing force→440 kg
    Transformation ratio→30:1

(7) Tensile Strength After Welding
    504–647 kg

EXAMPLE 2

(1) Construction of Cathode Rib
    Material→Nickel
    Thickness→1.5 mm
    Number of projections→One per pan contact portion
    Height of projections→0.8 mm
    Diameter of projections→7.0 mm (2) Construction of Cathode Pan
    Material→Nickel
    Thickness→1.0 mm (3) Construction of Clad Plate
    Material→Stainless steel layer (SUS316)+titanium layer
    Thickness of stainless steel layer→3.0 mm
    Thickness of titanium layer→0.5 mm (4) Construction of Anode Pan
    Material→Titanium
    Thickness→1.0 mm (5) Construction of Anode Rib
    Material→Titanium
    Thickness→1.5 mm
    Number of projections→One per pan contact portion
    Height of projections→0.3 mm
    Diameter of projections→7.0 mm (6) Welding Condition
    Weld voltage→400 V
    Pressing force→440 kg
    Transformation ratio→30:1

(7) Tensile Strength After Welding
    584–871 kg

EXAMPLE 3

(1) Construction of Cathode Rib
    Material→Nickel
    Thickness→1.5 mm
    Number of projections→One per pan contact portion
    Height of projections→0.8 mm
    Diameter of projections→7.0 mm (2) Construction of Cathode Pan
    Material→Nickel
    Thickness→1.0 mm (3) Construction of Clad Plate
    Material→Iron layer+titanium layer
    Thickness of iron layer→3.3 mm
    Thickness of titanium layer→0.7 mm (4) Construction of Anode Pan
    Material→Titanium
    Thickness→1.0 mm (5) Construction of Anode Rib
    Material→Titanium
    Thickness→1.5 mm
    Number of projections→One per pan contact portion
    Height of projections→0.3 mm
    Diameter of projections→7.0 mm (6) Welding Condition
    Weld voltage→440 V
    Pressing force→440 kg
    Transformation ratio→30:1

(7) Tensile Strength After Welding

760–1066 kg

As described above, the tensile strength obtained is higher than that of the base material in all of the examples 1 to 3, thus realizing a sufficient weld strength for the electrolyzer unit.

Next, the shapes of the cathode ribs 16 and the anode ribs 12 used in this embodiment will be described in detail.

The cathode ribs 16 and the anode ribs 12 are used to form predetermined spaces between the cathode 17 and the cathode pan 15 and between the anode 13 and the anode pan 11. These ribs therefore need to have at least contact portions for electrodes, contact portions for the surfaces of the pans, and spacer portions for ensuring a predetermined distance between the electrode contact portions and the pan surface contact portions. Further, the spacer portions need to have appropriate openings for ensuring flows of the liquid to be processed and the electrolysis products in transverse directions. Furthermore, to enable an automatic welding using a spot welder, it is desired that the pan contact portions be formed into a flange shape having a predetermined area.

Figure 15:
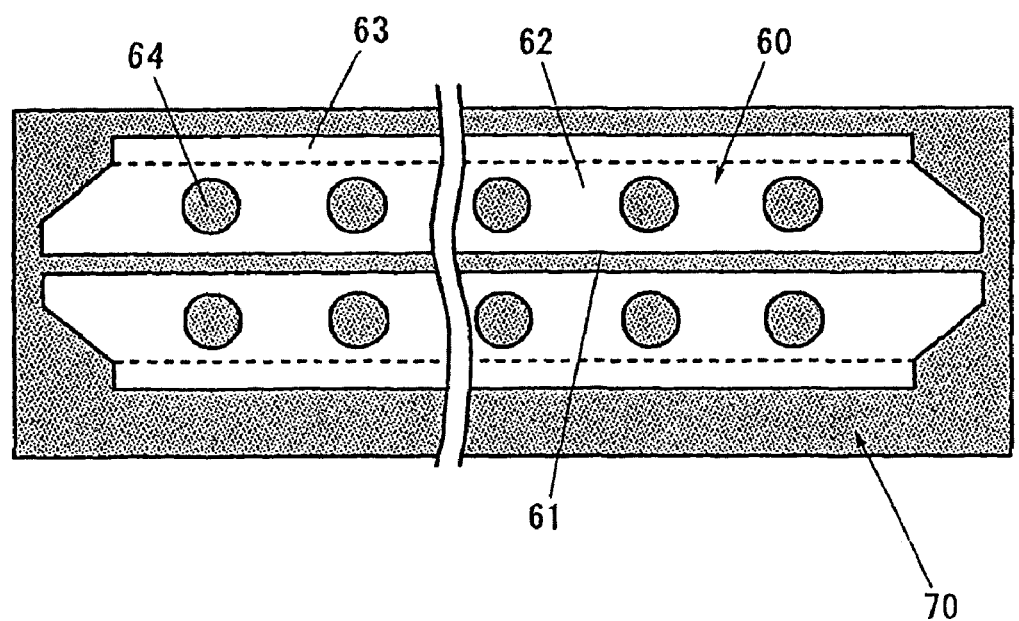
FIG. 15 is a plan view showing the structure of a conventional rib.

Considering the above, a conventional rib 60 has a linear electrode contact portion 61 and a platelike spacer portion 62 of a predetermined height as shown in FIG. 15. The spacer portion 62 is bent along a dotted line on one side to form a flange-shaped pan contact portion 63. Openings 64 are perforated in the spacer portion 62 to form passages for liquid and gas.

Figure 16:
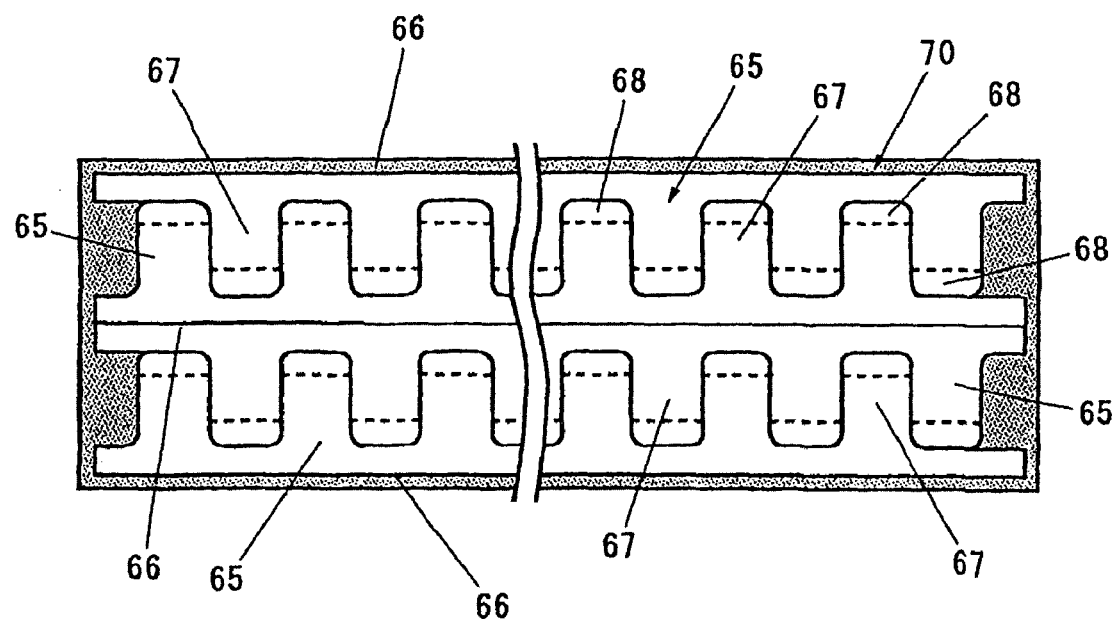
FIG. 16 is a plan view showing the structure of a rib for an electrolyzer unit according to the invention.

A rib 65 (the cathode rib 16 and the anode rib 12) of the electrolyzer unit 10 according to the invention, on the other hand, has a linear electrode contact portion 66 and a large number of spacer portions 67 projecting like comb-teeth from the electrode contact portion 66, as shown in FIG. 16. The rib is of the structure that a front end side of each spacer portion 67 is bent along a dotted line to form a pan contact portion 68. Since the spacer portions 67 are formed like comb-teeth, when the pan contact portions 68 are fixed to the surface of the pan, openings between the spacer portions 67 naturally provide passages for gas and liquid.

The most significant feature of the ribs 65 is that the spacer portions 67 are formed like comb-teeth and the ribs 65 can be cut efficiently from a blank plate 70. That is, as apparent from FIG. 16, when one rib 65 is cut from the blank plate 70, another rib 65 is automatically formed, making efficient use of the blank plate 70 without waste. Setting the lateral width of and the distance between the spacer portions 67 at the same size, the cutting of one rib 65 can form another rib 65 of almost the same shape.

In the conventional ribs 60, on the other hand, the blank plate 70 is cut to a necessary height, followed by the openings 64 being cut to form gas/liquid passages. Not only does this process require many cutting steps but portions cut from the openings 64 are discarded.

As a comparison between FIG. 15 and FIG. 16 shows, when the ribs of the same height are to be cut from the blank plates 70 of the same area, it is possible to cut four comb-tooth ribs 65 while only two conventional ribs 60 at most can be obtained.

The use of the comb-tooth ribs can further reduce the shunt current during welding.

The capacitor type welder is inherently sufficed by a short period of current application and thus has an advantage that a shunt current will not easily occur. In addition, in the case of comb-tooth electrodes, the conduction distance to the adjoining welding point naturally becomes longer, making current leakage (shunt current) unlikely from welded portions of reduced resistance.

Therefore, by narrowing the pitch between the rib contact portions to increase the number of welding points, the welding strength of the rib as a whole can be easily increased.

In the above, described is the example wherein the electrodes and the ribs are formed as separate members and, at the final stage of the manufacturing process, are welded together. They may be formed integral from the beginning to further simplify the manufacturing process.

Figure 17:
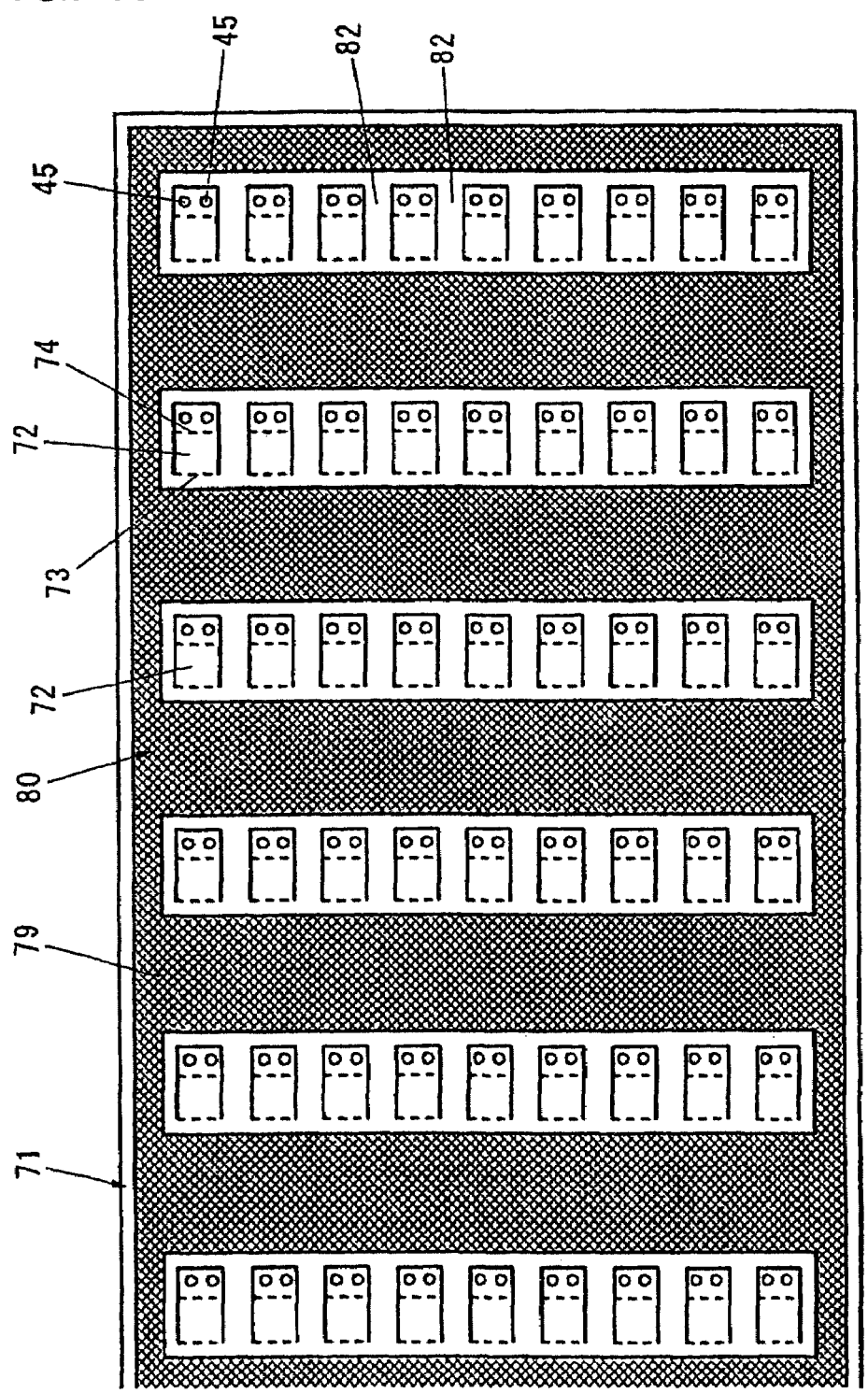
FIG. 17 is a plan view showing an example where an electrode and ribs are integrally formed.
Figure 18:
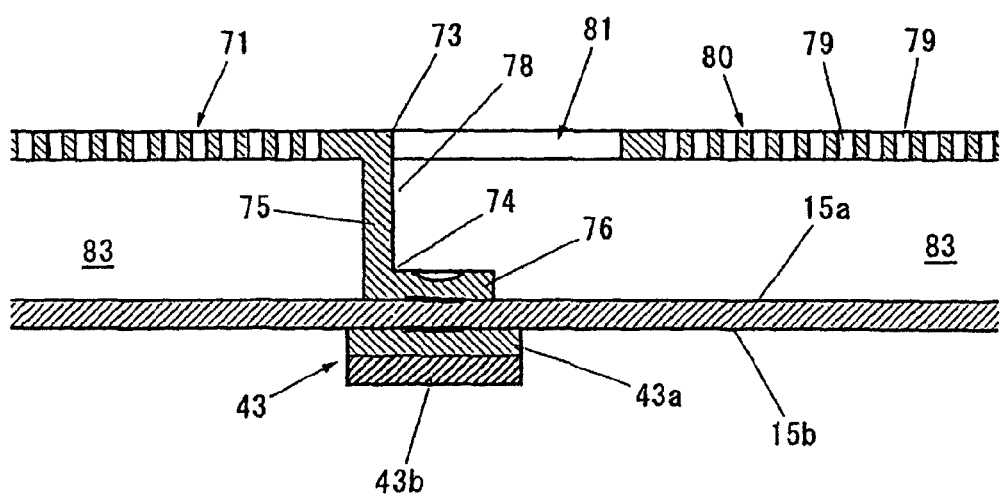
FIG. 18 is an enlarged, partial section view showing the example where the electrode and ribs are integrally formed.

FIG. 17 shows such an example, in which a surface of a metal plate 71 of titanium or nickel is formed with a large number of "⊐-shaped" cuts (corresponding to three sides of rectangles) and respective cut portions 72 are bent almost at right angles along a first dotted line 73 (corresponding to the remaining side of the rectangles) and then further bent horizontally along a second dotted line 74 to form ribs 78 each having spacer portions 75 and flange-shaped pan contact portions 76, as shown in FIG. 18.

The remaining part of the metal plate 71 is formed with a large number of through-holes 79 to form an electrode 80.

The cuts are not limited to the above shape and may be in "a U shape" or "a V shape".

The pan contact portions 76 are each formed with projections 45 by stamping in advance. Welding electrodes are introduced through openings 81 formed by bending the cut portions 72 to perform the capacitor type projection welding at welding points between the pan contact portions 76 and the front surface 15a of the pan and between the back surface 15b of the pan and the clad plates 43 at once.

If the cut portions 72 are spaced a predetermined gap 82 from each other, flow passages 83 for gas and liquid in transverse directions can be ensured between the spacer portions 75, 75.

Next, referring to FIG. 19 to FIG. 22, a welding system for efficiently performing the capacitor type projection welding will be described.

Figure 19:
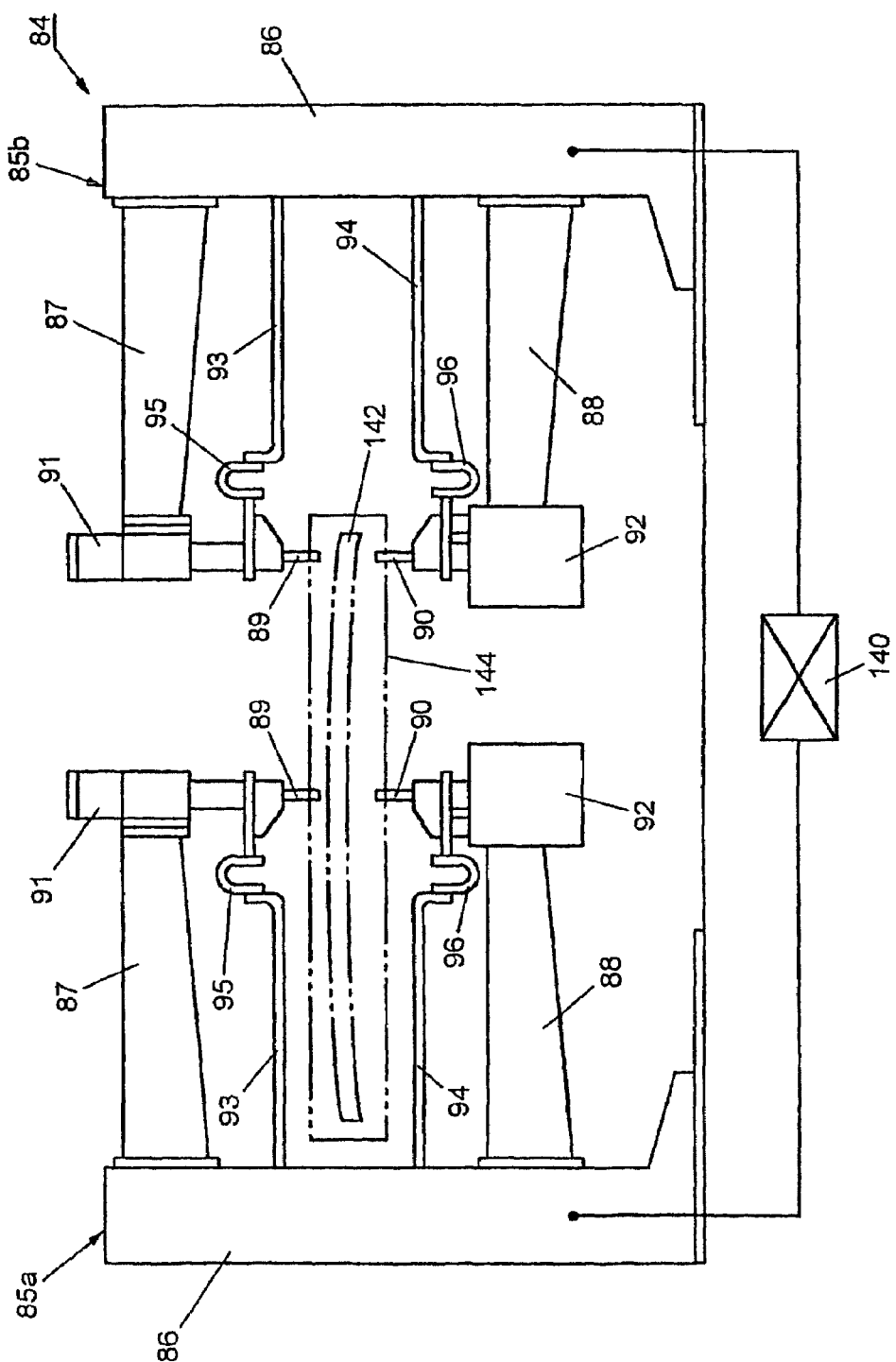
FIG. 19 is a conceptual diagram showing an overall construction of a welding system according to the invention.

First, the welding system 84 has a pair of capacitor type welders 85a, 85b arranged opposite to each other, as shown in FIG. 19.

Each of the capacitor type welders 85a, 85b has a column 86, an upper arm 87 horizontally extending from an upper end portion of the column 86, a lower arm 88 horizontally extending from a lower end portion of the column 86, an upper electrode 89 provided at a front end of the upper arm 87, and a lower electrode 90 provided at a front end of the lower arm 88.

An air cylinder 91 is connected to a rear end of the upper electrode 89 and supplied with compressed air from a compressor, not shown, for realizing a vertical movement of the upper electrode 89. Instead of the air cylinder 91, the driving force of a servo motor may be used for vertically moving the upper electrode 89.

At a rear end of the lower electrode 90 a vertical drive unit 92 is provided, which has an internal servo motor and a ball screw driving the lower electrode 90 to realize its vertical movement.

The upper electrode 89 and the lower electrode 90 are respectively connected through conducting paths 93, 94 to capacitors, not shown. The conducting paths 93, 94 have flexible portions 95, 96 that are deformable according to the vertical motions of the upper electrode 89 and the lower electrode 90.

Figure 20:
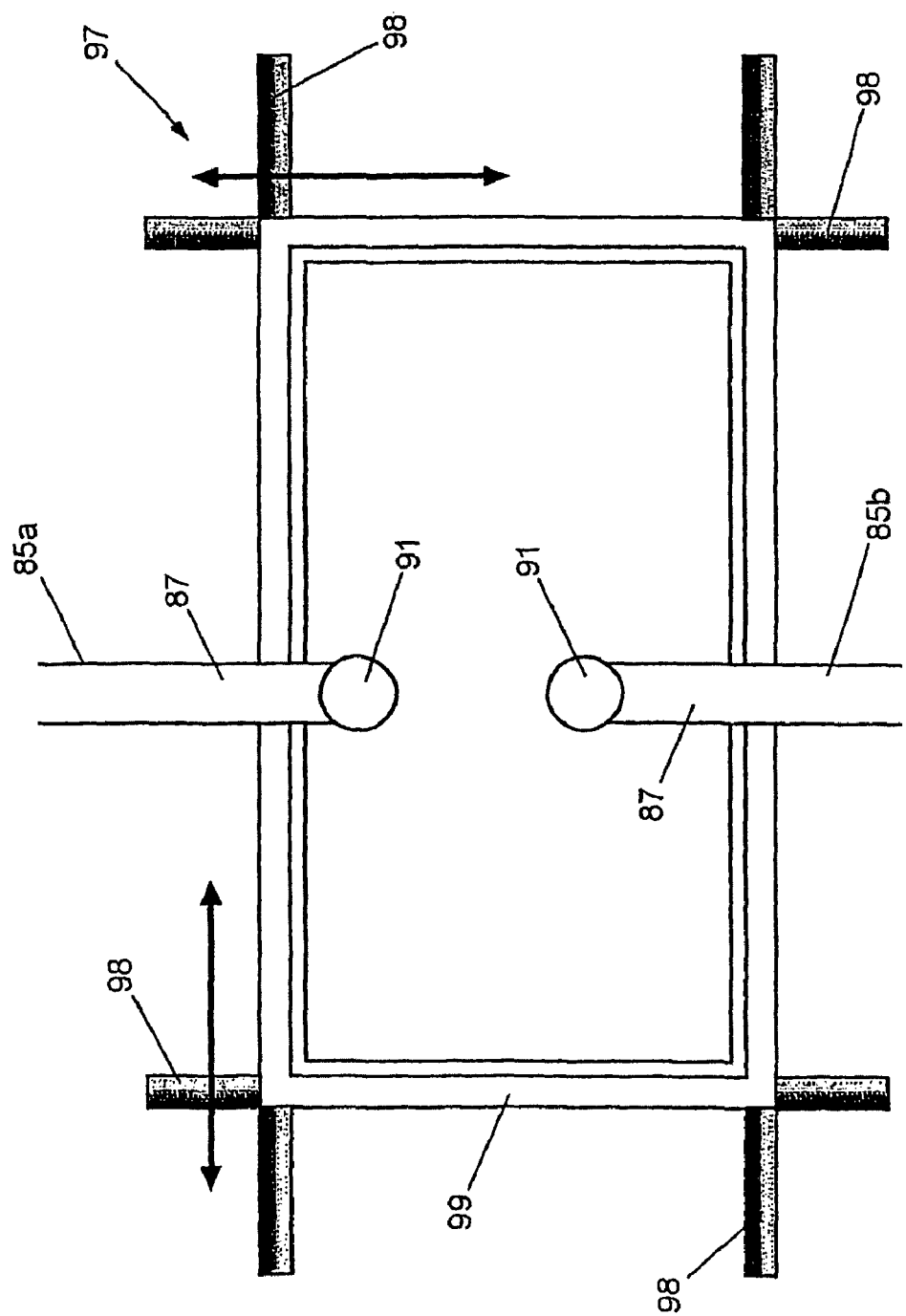
FIG. 20 is a plan view showing the state of an XY stage arranged between a pair of welders.

As shown in FIG. 20, between the capacitor type welders 85a, 85b is arranged an XY stage 97, which has a support frame 99 driven by servo motors and ball screws, not shown, along rails 98 in the X and Y directions.

The welders 85a, 85b and the XY stage 97 are controlled by commands from a controller 140 having a CPU, a memory and an input/output unit.

Figure 21:
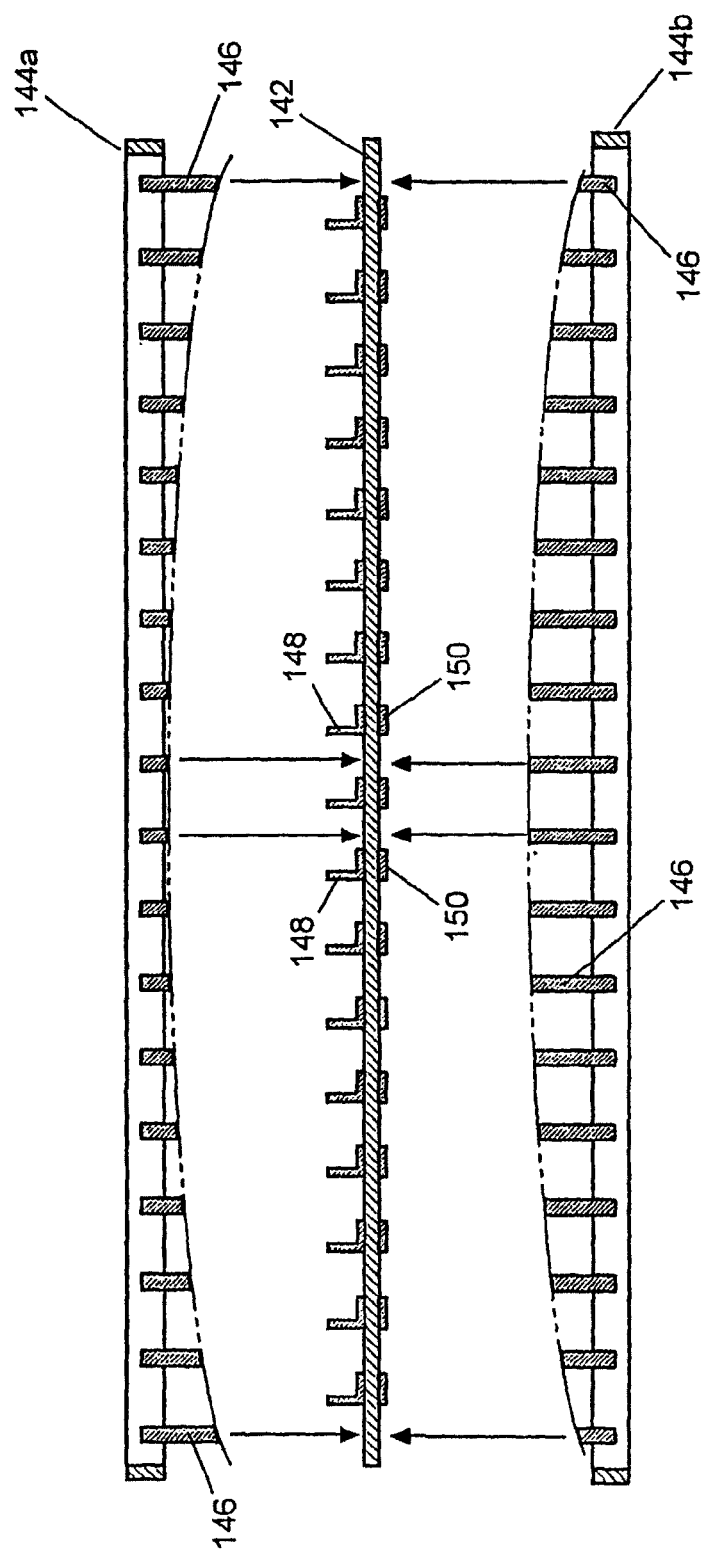
FIG. 21 is a section view showing a pair of magazines disposed on the top and bottom surfaces of the pan.

On the support frame 99 of the XY stage 97 is mounted a pan (anode pan 11 or cathode pan 15) that is to be welded, and simultaneous welding with ribs (anode ribs 12 or cathode ribs 16) and with clad plates 43 is performed. At this time, as shown in FIG. 21, the pan 142 is clamped between a pair of magazines 144a, 144b from above and below to give the pan a reverse strain.

That is, the upper magazine 144a has a plurality of engagement plates 146 arranged like comb-teeth at predetermined intervals, and the engagement plates 146 have heights so designed as to progressively decrease from the left and right end plates toward the center plate. The lower magazine 144b similarly has a plurality of engagement plates 146 arranged like comb-teeth at predetermined intervals, and the heights of the engagement plates 146 are so designed as to progressively increase from the left and right end plates toward the center plate.

The pan 142 is placed between the upper magazine 144a and the lower magazine 144b of the above construction, and these magazines are secured to each other while clamping the pan from above and below. Then, the end faces of the engagement plates 146 press the front surface of the pan 142 (between ribs 148, 148) and the back surface of the pan 142 (between clad plates 150, 150), thereby curving the pan in an arcuate shape as shown in FIG. 22.

Figure 22:
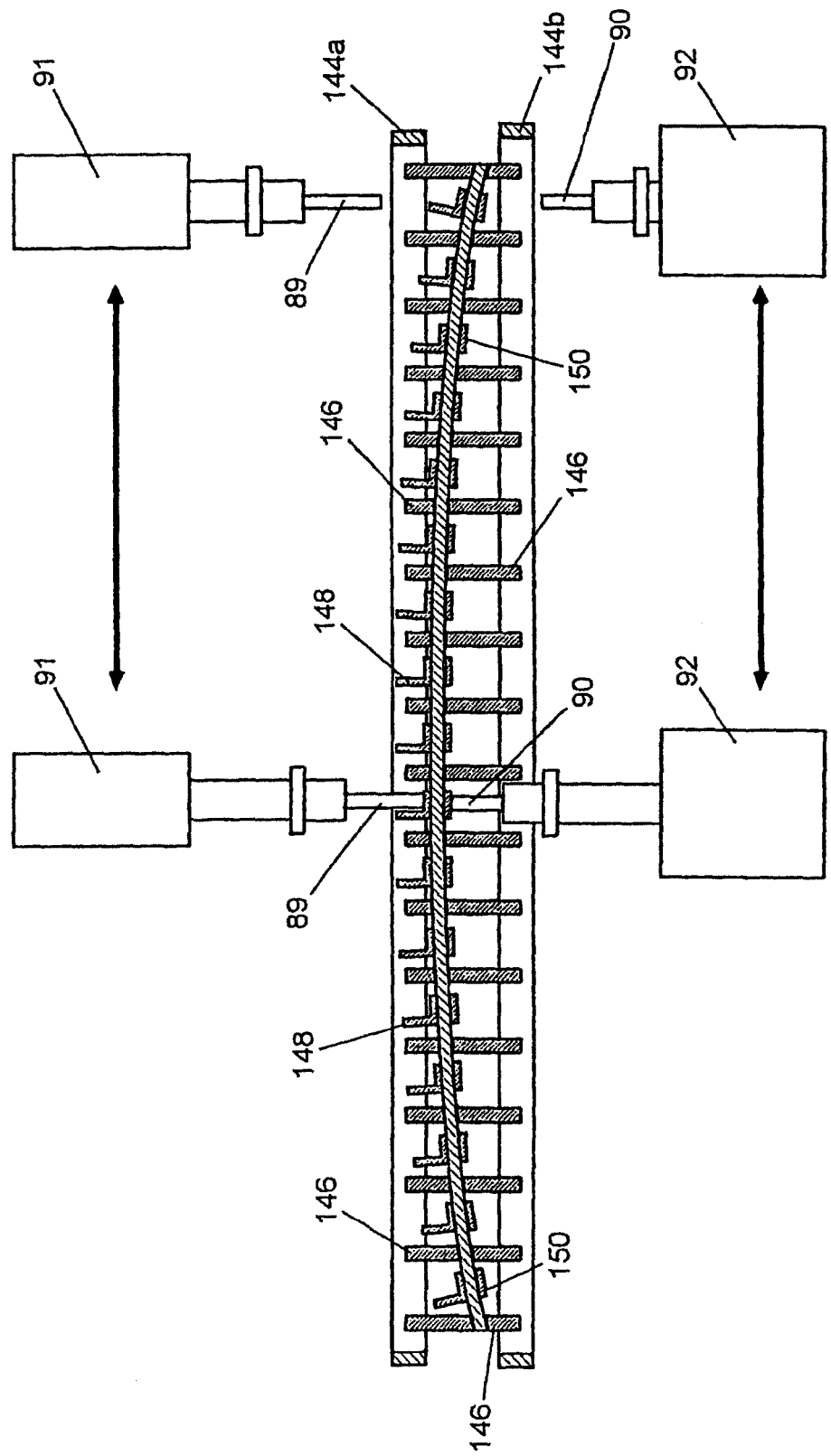
FIG. 22 is a sectional view showing the state in which the pair of magazines clamp the top and bottom surfaces of the pan to curve the pan.

For simplifying the illustration, FIG. 22 shows only the pan 142, the ribs 148 arranged on the front surface of the pan 142 and the clad plates 150 arranged on the back surface of the pan, and the jig is omitted in the figure. Actually, however, the jig 44 similar to that shown in FIG. 5 is used to arrange and fix the ribs 148 and the clad plates 150 at predetermined pitches. The ribs 148 are each formed with projections beforehand. The engagement plates 146 each have notches for avoiding contact with the jig 44 (not shown).

A welding procedure using the welding system 84 will now be explained.

First, a program for controlling the operations of the capacitor type welders 85a, 85b and the XY stage 97 is stored in the memory of the controller 140. Setting items in this program include information on the pitch between the ribs 148, 148 and a pitch between the welding points (or a pitch between the projections), information on an applied voltage value, etc.

Next, the pan 142 clamped between the upper and lower magazines 144a, 144b is mounted on the support frame 99 of the XY stage 97.

At this time, when an operator turns on a start switch, the XY stage 97 is moved a required distance in a required direction to position the upper electrode 89 and the lower electrode 90 of the respective capacitor type welders 85a, 85b at a reference point on the pan 142. During the movement of the XY stage 97, the lower electrode 90 has already been lowered to the lowest position by the vertical drive units 92, so that the lower electrode 90 is not caught by the engagement plates 146 of the lower magazine 144b or the jig.

The lower electrode 90, at the time when reaching the reference point, starts moving up and stops moving when it contacts the clad plate 150. A weak voltage is applied to the pan 142, and the controller 140 can detect, from current conduction through the contact of the lower electrode 90, the advance of the lower electrode 90 to the clad plate 150.

Then, responsive to a drive command from the controller 140, the upper electrode 89 is lowered to press the projections with a predetermined pressure, and a DC voltage stored in a capacitor, not shown, is instantaneously applied.

As a result, the rib 148 and the pan 142 are welded, and at the same time welding between the pan 142 and the clad plate 150 is also completed.

Next, the upper electrode 89 is raised while the lower electrode 90 is lowered, and then the support frame 99 of the XY stage 97 is moved a required distance in a required direction to have the next welding point positioned between the upper electrode 89 and the lower electrode 90. Then, the welding for this welding point is performed in the same manner as described above.

The controller 140 drives the XY stage 97 according to the pitch of the welding points preset in the memory and, when the welding for the last welding point is finished, moves the XY stage 97 to its original position to complete the welding operation.

As described above, since the pan 142 is subjected to a reverse strain by the engagement plates 146 of the magazines 144a, 144b, thermal strains produced during the welding process are effectively canceled.

Therefore, when, after the completion of welding, the pan 142 is taken out from the magazines 144a, 144b, the pan is almost free from distortions, enabling the thermal strain removing process to be omitted.

Since the degree of thermal strain produced during the welding process depends on the number of welding points, the materials and thicknesses of the pan 142 and the ribs 148 and the applied voltage value, the degree of the reverse strain needs to be adjusted to an optimum value according to an object to be welded. More specifically, the adjustment includes optimizing degree and direction of curvature of the pan 142 by changing height patterns of the engagement plates 146 in the magazines 144a, 144b.

The magazines 144a, 144b have a plurality of engagement plates 146 whose heights progressively increase or decrease toward the center plate and which are arranged parallel to the ribs 148 and the clad plates 150. Other magazines may be used to apply a reverse strain to the pan 142.

Figure 23:
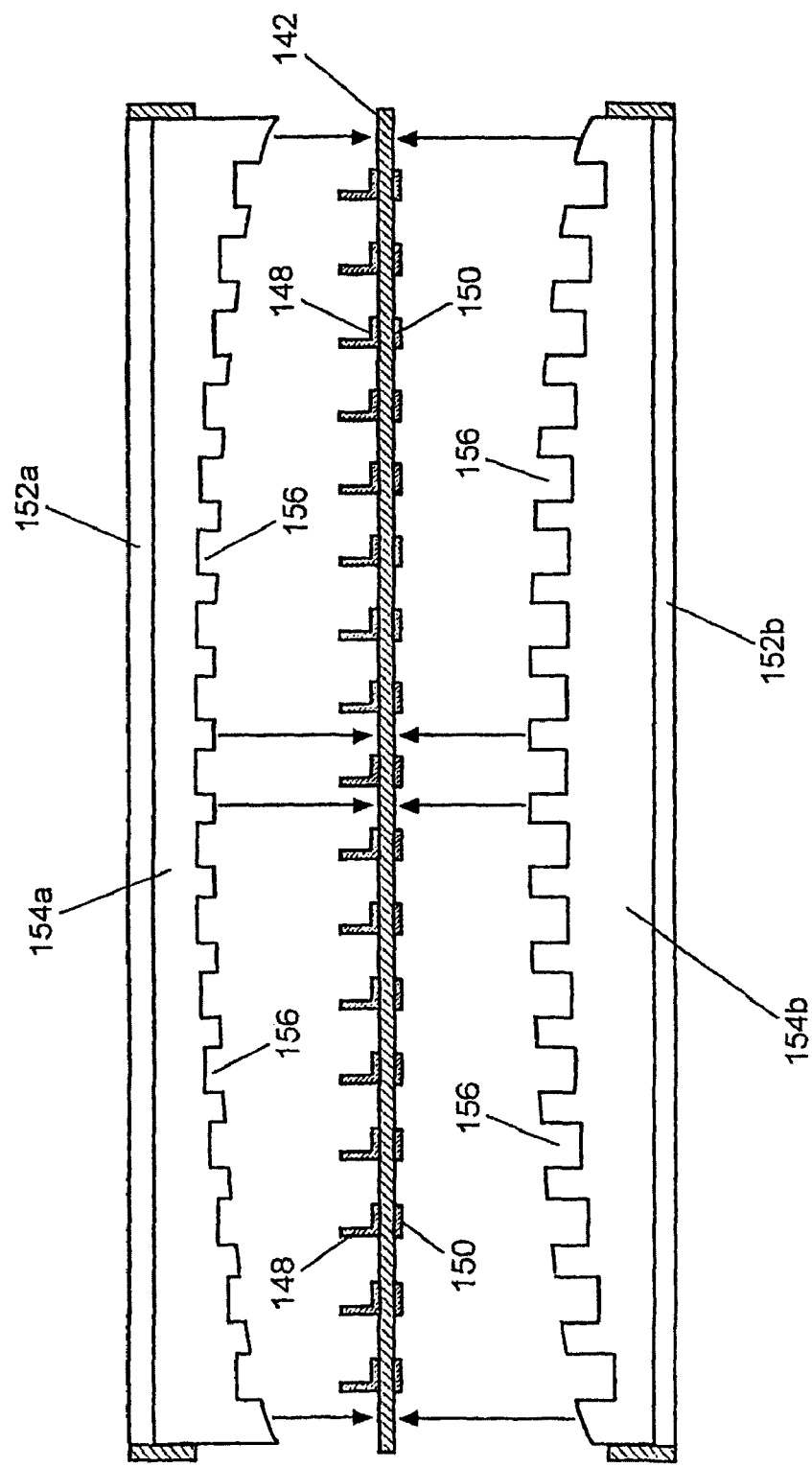
FIG. 23 is a section view showing the state of other magazines disposed on the top and bottom surfaces of the pan.

FIG. 23 shows such an example, in which an upper magazine 152a has engagement plates 154a arranged perpendicularly to the respective ribs 148 (although only one engagement plate 154a is illustrated in FIG. 23, actually a plurality of engagement plates 154a are arranged at predetermined intervals). The height of each engagement plate 154a is designed to progressively decrease from the left and right ends toward the center. Further, each engagement plate 154a has notches 156 to avoid contact with the ribs 148.

A lower magazine 152b has a plurality of engagement plates 154b arranged perpendicularly to the respective clad plates 150. The height of each engagement plate 154b progressively increases from the left and right ends toward the center. Further, each engagement plate 154b has notches 156 to avoid contact with the ribs 148.

Clamping the pan 142 from above and below by the magazines 152a, 152b having these engagement plates 154a, 154b, the front ends of the respective engagement plates 154a, 154b come into contact with the surfaces of the pan 142 and force it to curve.

In the above, described is the example of curving the pan 142 in a longitudinal direction by the magazines 144a, 144b and 152a, 152b. The direction of the reverse strain is not limited to this example.

That is, the pan 142 may be curved in a widthwise direction or in both the longitudinal and widthwise directions depending on the direction of thermal strain that actually occurs during welding. In this case, magazines need to be prepared which have engagement plates structured so that the central part of the pan 142 will be raised.

Further, dedicated engagement plates may be used to press against the ribs 148 and the clad plates 150 from above and below to curve the ribs 148 and the clad plates 150 as well as the pan 142 simultaneously.

Moreover, by improving the structure of the magazines and jigs, this welding system 84 can be applied not only to the three-layer simultaneous welding between ribs 148, pan 142 and clad plates 150 but also to the five-layer simultaneous welding between first ribs, first pan, clad plates, second pan and second ribs.

As described above, this welding system 84 uses the capacitor type welders 85*a*, 85*b* which produce less thermal strains as compared with the AC spot welder and applies a reverse strain to each pan 142 by the magazines 144*a*, 144*b* (or magazines 152*a*, 152*b*) to minimize the thermal strain that remains after welding.

Further, cooling water may be circulated in the upper electrode 89 and the upper electrode 89 may be kept in contact with the welded points for some time after welding, to positively reduce the thermal strains.

Figure 24:
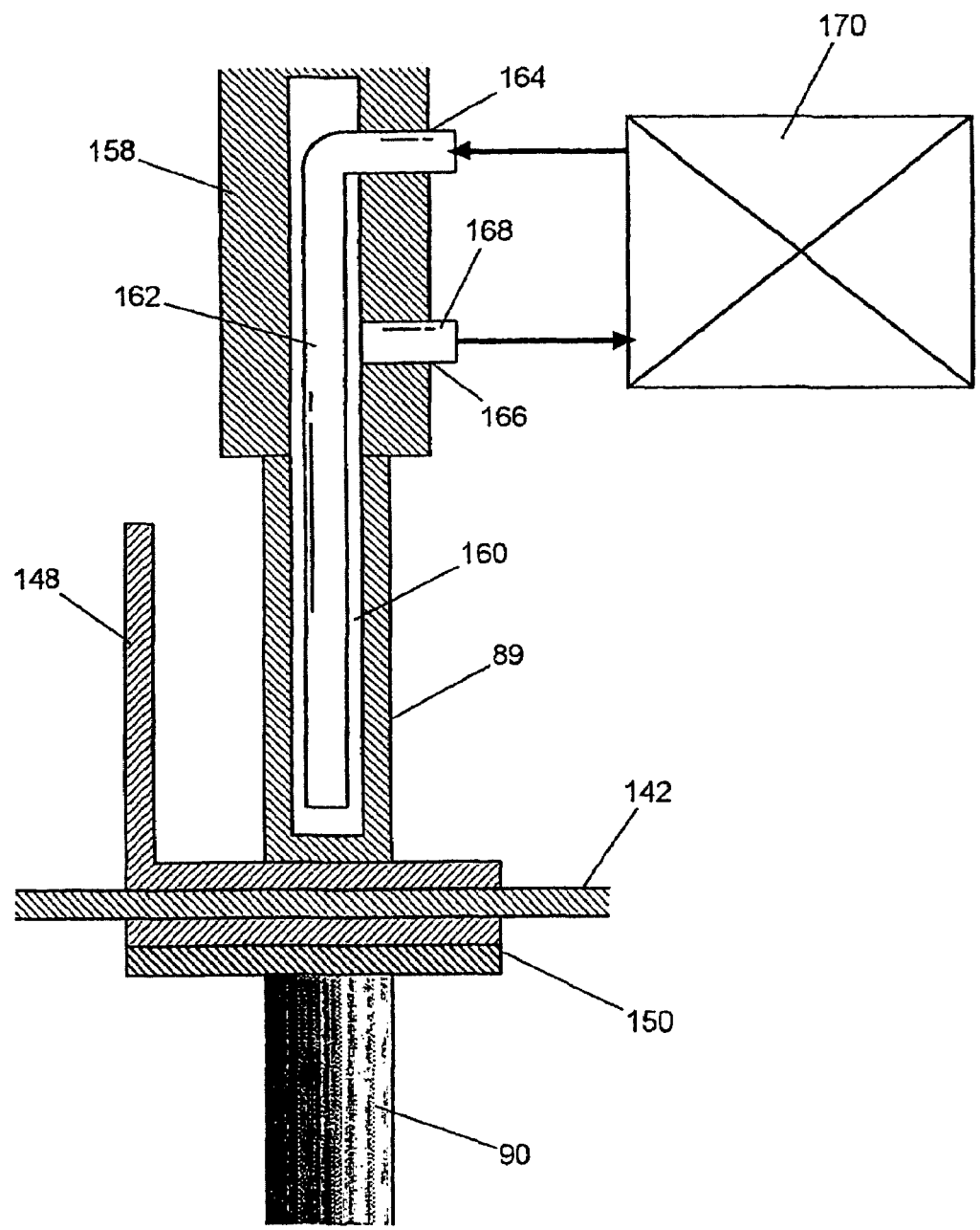
FIG. 24 is a section view showing the internal structure of an upper electrode of the welder and an electrode rod supporting the electrode.
Figure 25:
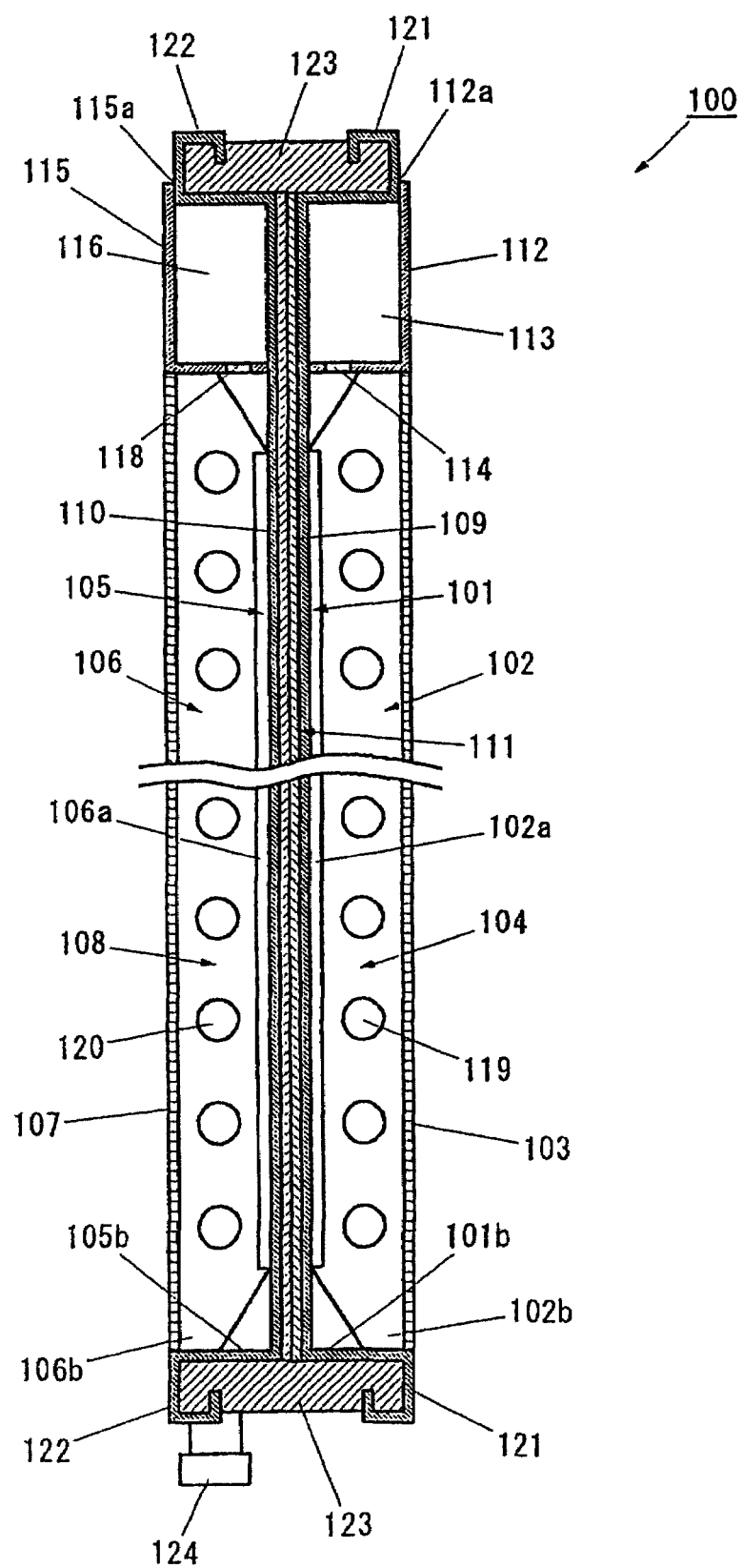
FIG. 25 is a schematic section view showing a conventional electrolyzer unit.
Figure 26:
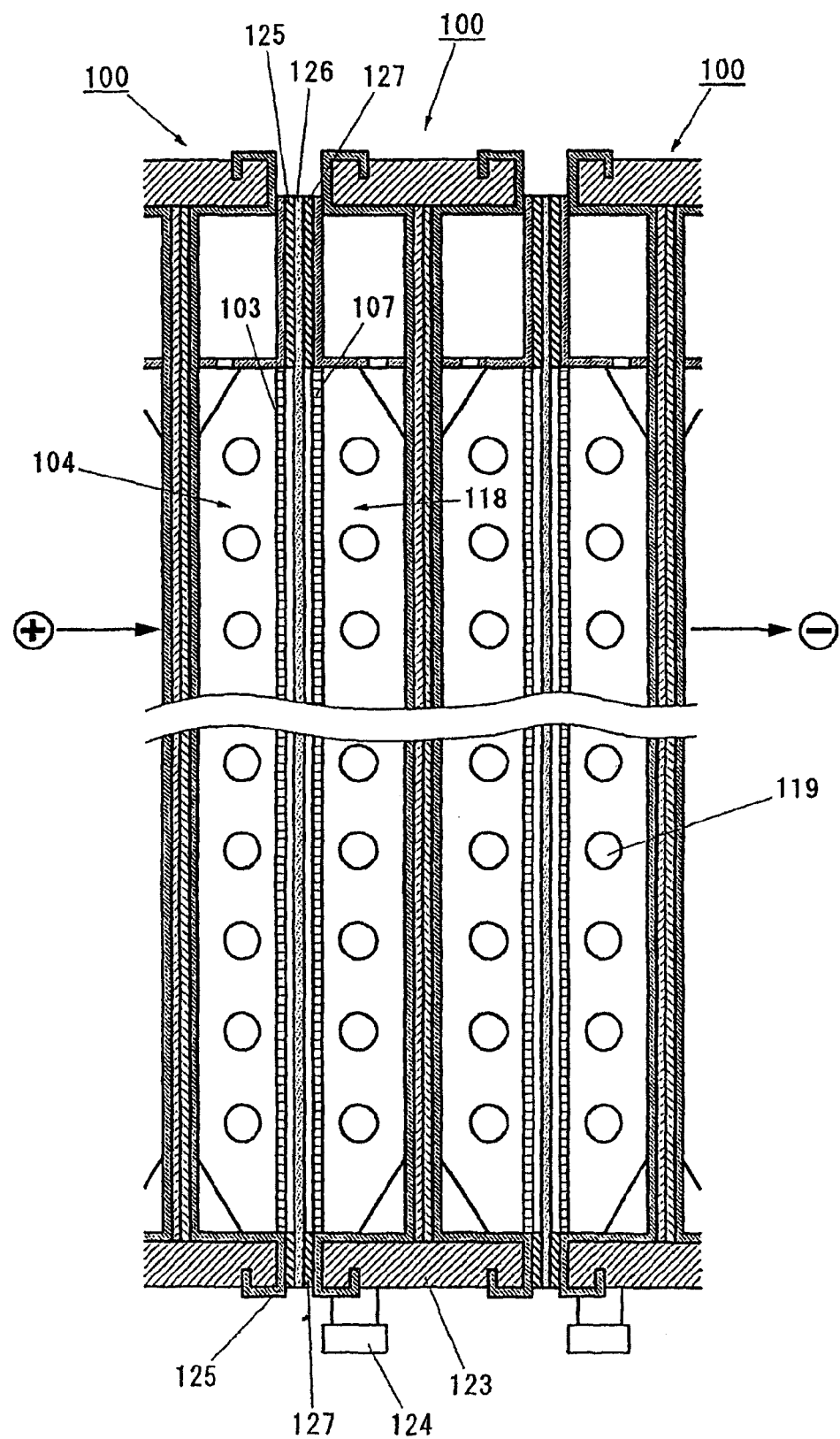
FIG. 26 is a schematic section view showing an example of use of the conventional electrolyzer unit.
Figure 27:
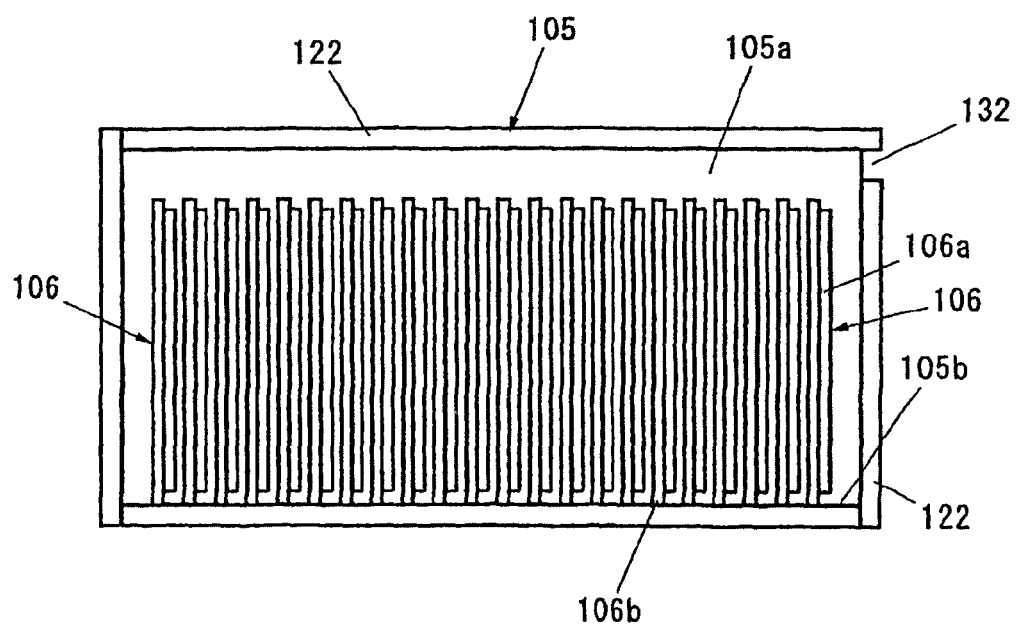
FIG. 27 is a plan view showing a process of manufacturing the conventional electrolyzer unit.
Figure 28:
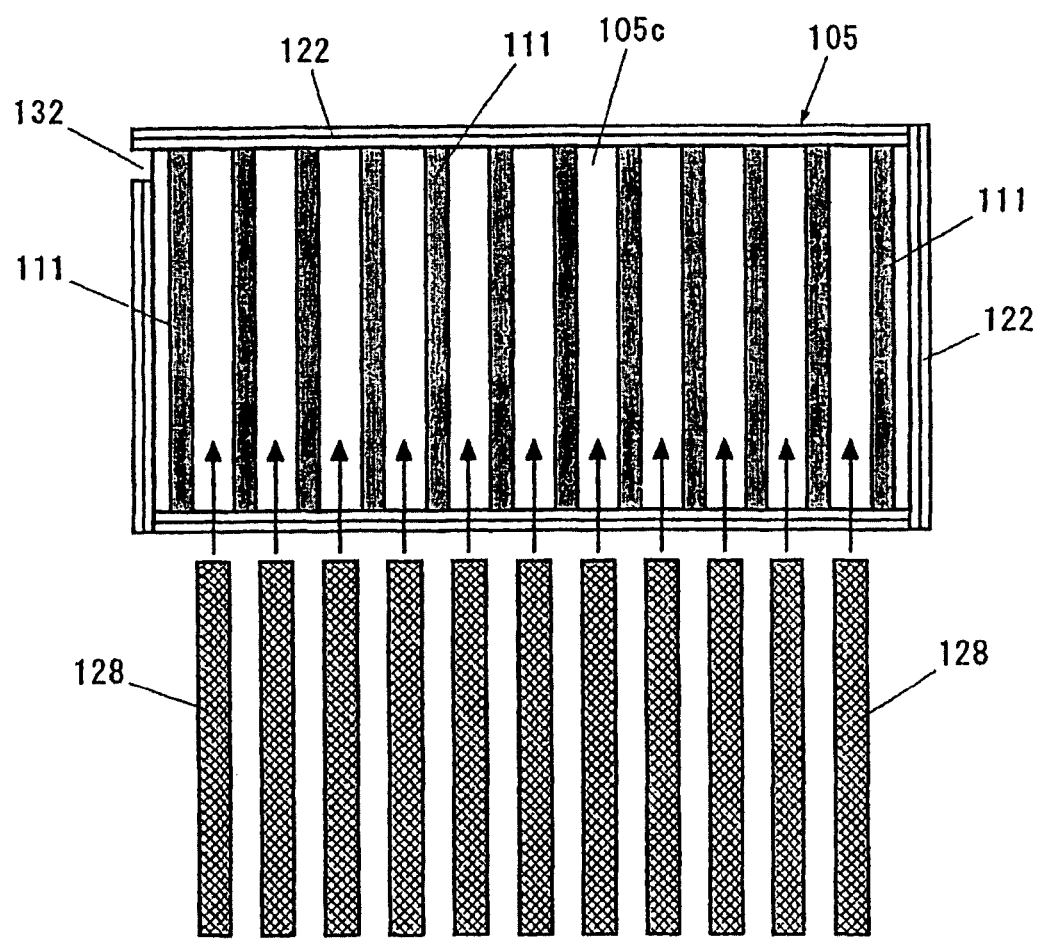
FIG. 28 is a plan view showing a process of manufacturing the conventional electrolyzer unit.
Figure 29:
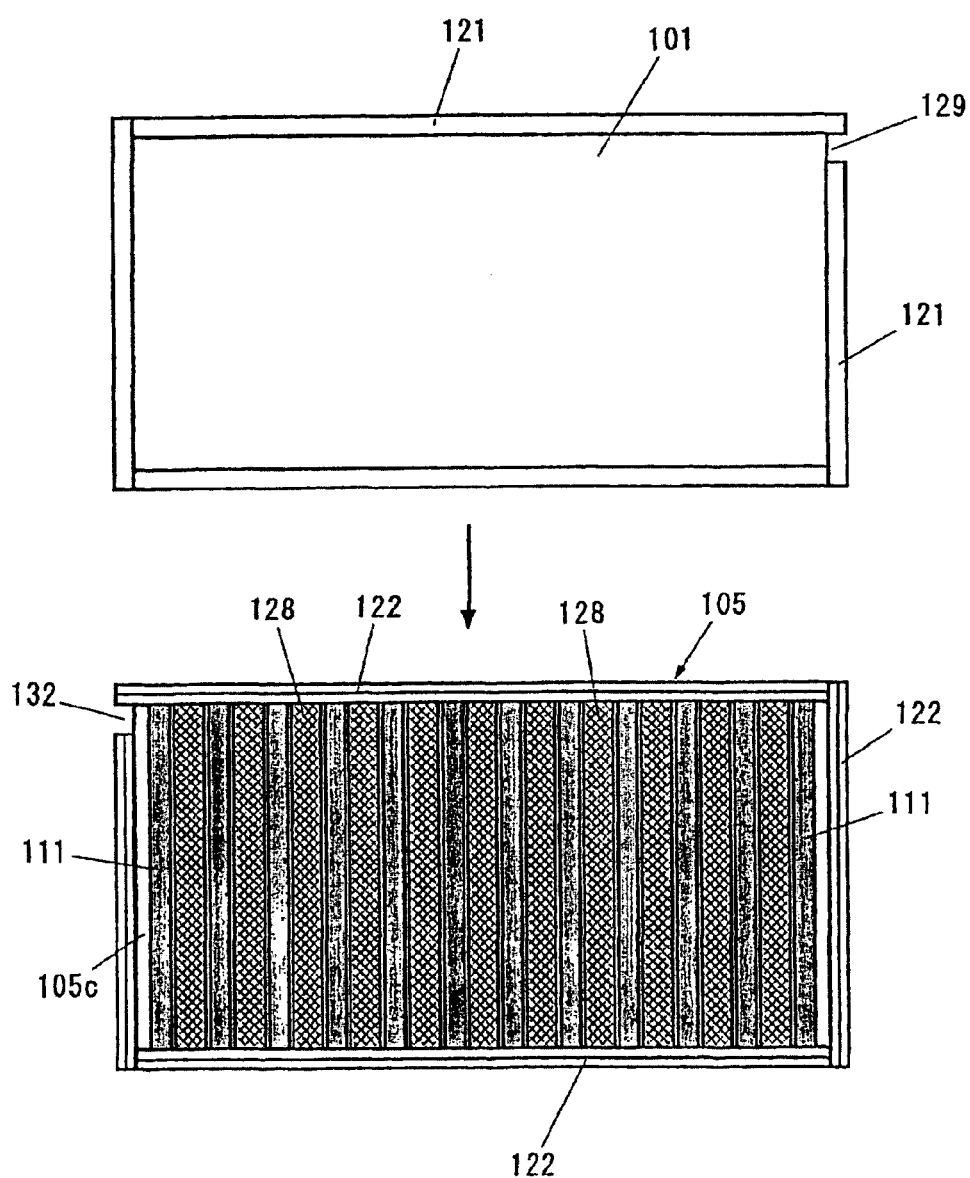
FIG. 29 is a plan view showing a process of manufacturing the conventional electrolyzer unit.
Figure 30:
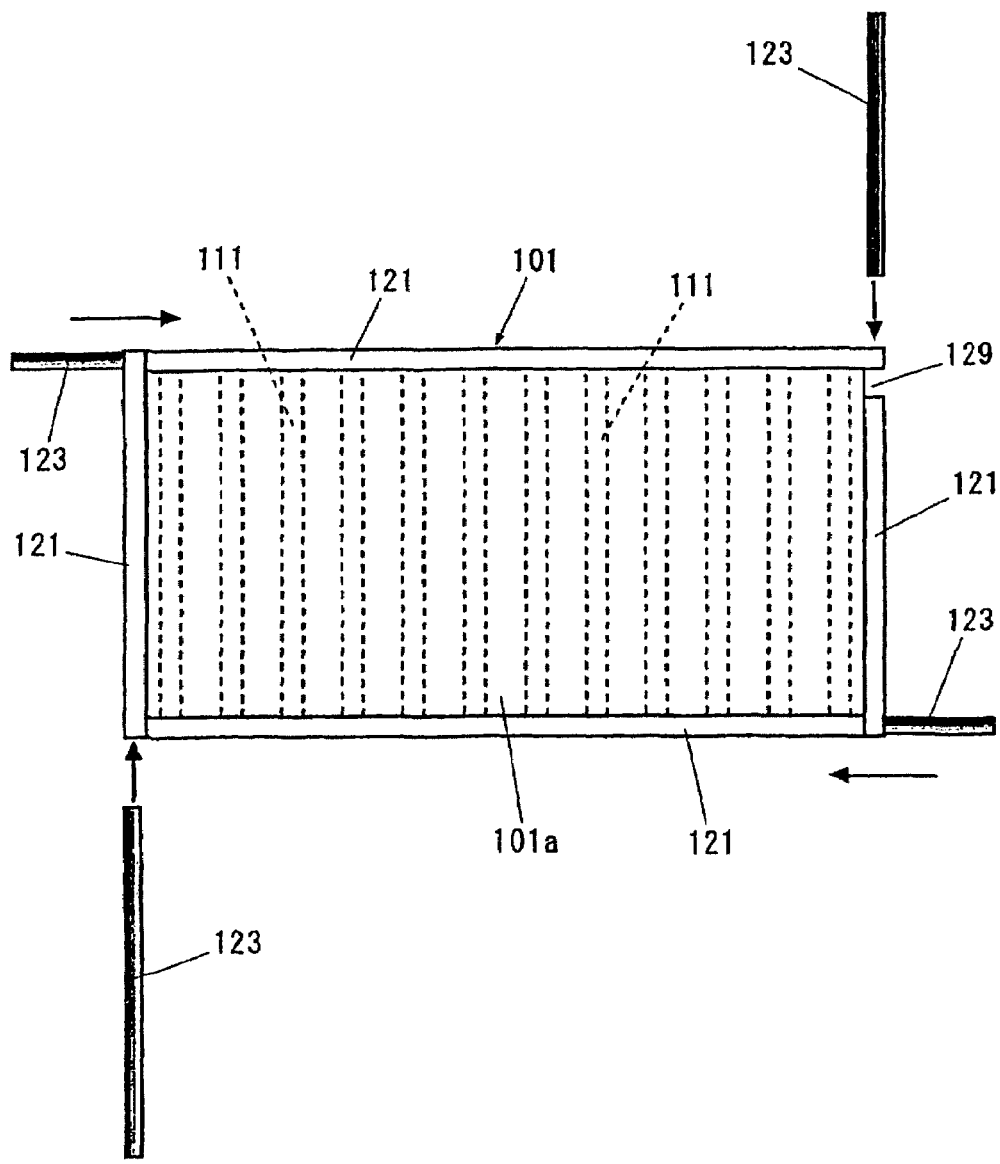
FIG. 30 is a plan view showing a process of manufacturing the conventional electrolyzer unit.
Figure 31:
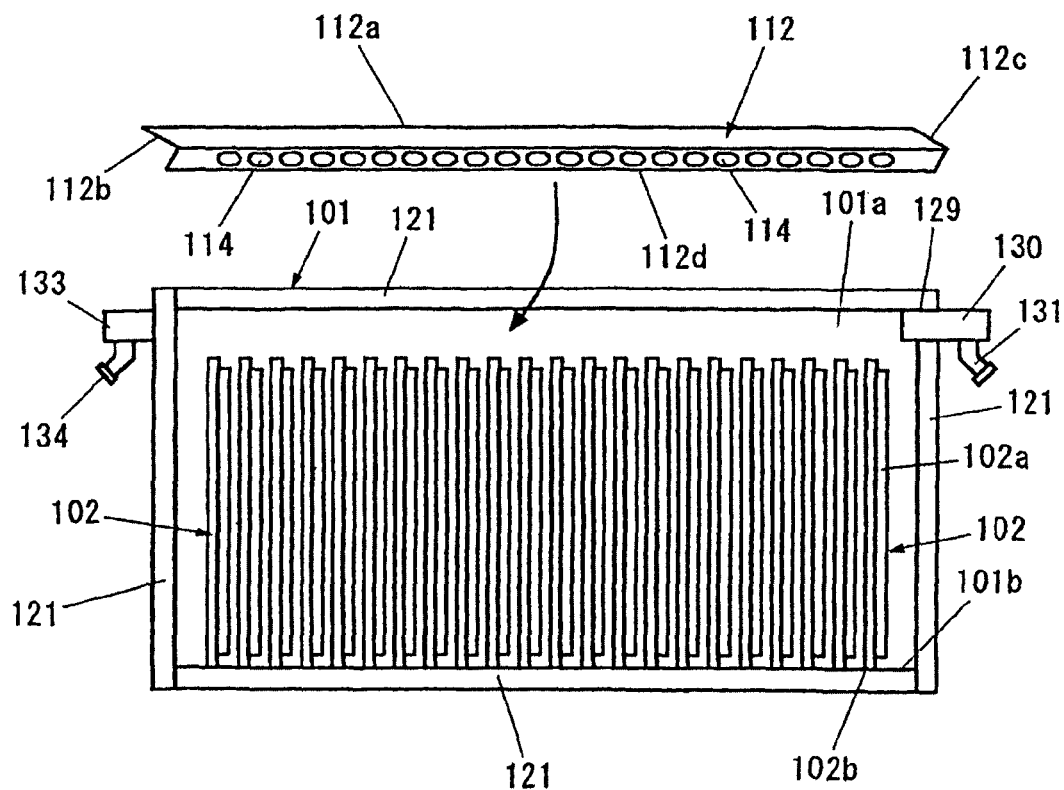
FIG. 31 is a plan view showing a process of manufacturing the conventional electrolyzer unit.
Figure 32:
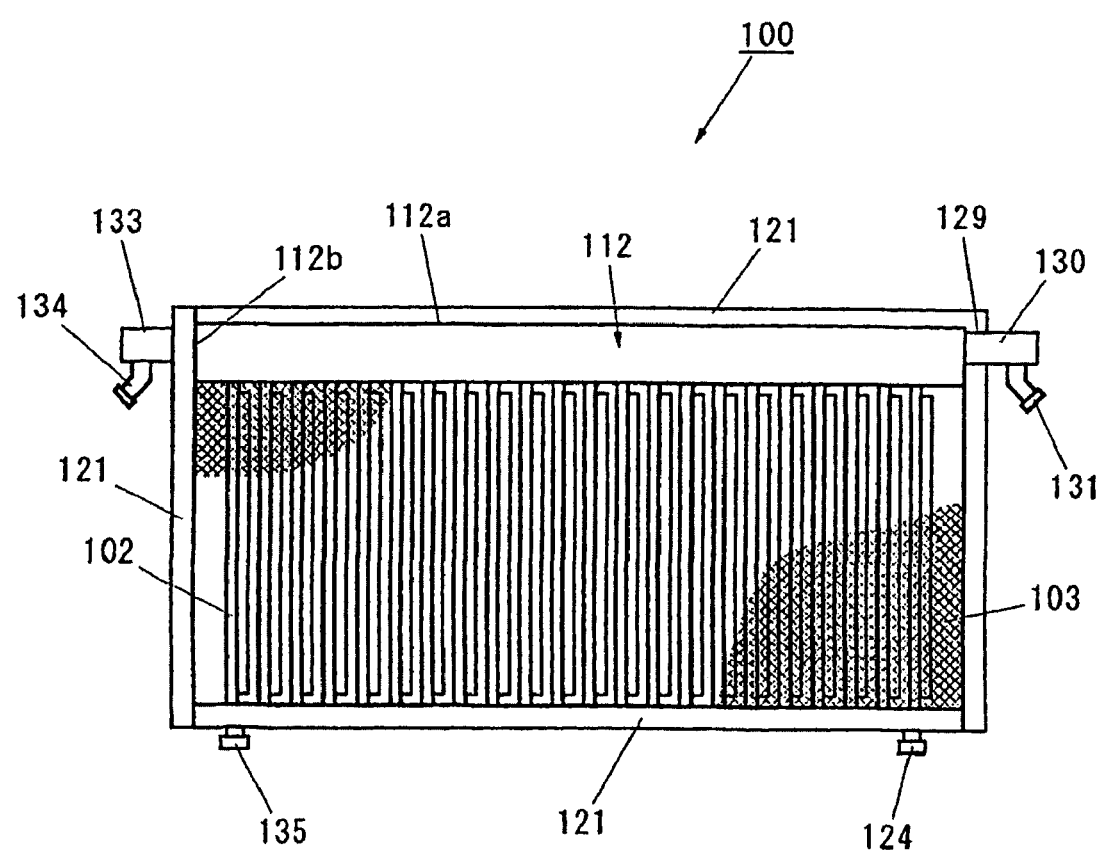
FIG. 32 is a plan view showing a process of manufacturing the conventional electrolyzer unit.

FIG. 24 is a cross section view showing the internal structure of the upper electrode 89 and an electrode rod 158 supporting the upper electrode 89. The upper electrode 89 and the electrode rod 158 have a hollow portion 160 therein in which a cooling water supply pipe 162 is installed.

A front end of the cooling water supply pipe 162 opens near the front end portion of the upper electrode 89. An L-shaped rear end of the cooling water supply pipe 162 is led out through an inlet hole 164 formed in the electrode rod 158.

Below the inlet hole 164 is formed a discharge hole 166 through which a discharge pipe 168 is inserted.

Cooling water supplied through a circulation pipe from a cooler 170 provided on the outside is discharged through the supply pipe 162 to the front end portion of the upper electrode 89. The water then flows through a gap between the supply pipe 162 and the hollow portion 160 and is drawn out through the discharge pipe 168.

The cooling water thus drawn outside is then cooled again in the cooler 170 before being supplied to the upper electrode 89 again.

The cooling water supplied from the cooler 170 has a temperature of around 1–5° C. for instance.

In this case, the upper electrode 89 is kept in contact with the welding point for a predetermined time (for example, two seconds) after the welding at each welding point is completed. This can enhance the cooling effect.

This welding system 84, because of having the two opposite welders 85*a*, 85*b* as described above, can effectively perform the welding process. The efficiency can further be enhanced by employing four or six welders.

On the contrary, it is of course possible to use a single welder to form the welding system, thereby seeking simplification of the construction and a reduction of the cost.

INDUSTRIAL APPLICABILITY

According to the method of this invention for manufacturing the electrolyzer unit, before installing the frame members between the flange portions of the first and second pans, the partition members and the flange portions are welded. This allows the welded portions to be checked from the back of the flange portions and has an advantage of effectively preventing liquid leakage due to defective welding.

Further, since only at the final stage where the main parts have already been attached onto the first and second pans, and the frame members installed to join these pans, it is possible to move and check individual pans most of the time in the electrolyzer unit manufacturing process. This can improve the manufacturing efficiency significantly.

Furthermore, by employing the welding method that realizes simultaneous welding between the first ribs, first pan and one surface of clad plates and between the second ribs, second pan and the other surface of clad plates, or by employing the welding method that realizes simultaneous welding between the first ribs, first pan, clad plates, second pan and second ribs, the number of welding steps can be reduced significantly and the manufacturing efficiency improved accordingly.

The invention claimed is:

1. A method of manufacturing an electrolyzer unit comprising the steps of:

arranging a partition member on a front surface of a first pan formed with flange portions at its periphery and welding at least a part of the partition member to the flange portions of the first pan to form a gas-liquid separation chamber;

arranging a partition member on a front surface of a second pan formed with flange portions at its periphery and welding at least a part of the partition member to the flange portions of the second pan to form a gas-liquid separation chamber;

arranging a plurality of first ribs on the front surface of the first pan and welding together the front surface of the first pan and the respective ribs;

arranging a plurality of clad plates on a back surface of the first pan and welding together the back surface of the first pan and one surface of the respective clad plates;

putting the back surface of the first pan over a back surface of the second pan and welding the back surface of the second pan to the other surface of the clad plates;

arranging a plurality of second ribs on the front surface of the second pan and welding the front surface of the second pan to the respective ribs; and inserting frame members into spaces formed between the flange portions of the first pan and the flange portions of the second pan, wherein when arranging the first ribs on the front surface of the first pan, front ends of the respective ribs are fitted into a plurality of openings formed beforehand in the partition member and then welding between the front surface of the first pan and the respective ribs is carried out; and when arranging the second ribs on the front surface of the second pan, front ends of the respective ribs are fitted into a plurality of openings formed beforehand in the partition member and then welding between the front surface of the second pan and the respective ribs is carried out.

2. A method of manufacturing an electrolyzer unit as claimed in claim 1, wherein, before all the frame members are inserted into the spaces formed between the flange portions of the first pan and the flange portions of the second pan, reinforcement members are inserted into vacant spaces between the back surface of the first pan and the back surface of the second pan.

3. A method of manufacturing an electrolyzer unit as claimed in claim 1, wherein before the partition members are arranged respectively on the front surfaces of the first pan and the second pan, discharge boxes are welded to the respective partition members.

4. A method of manufacturing an electrolyzer unit comprising the steps of:

arranging a partition member on a front surface of a first pan formed with flange portions at its periphery and welding at least a part of the partition member to the flange portions of the first pan to form a gas-liquid separation chamber;

arranging a partition member on a front surface of a second pan formed with flange portions at its periphery and welding at least a part of the partition member to the flange portions of the second pan to form a gas-liquid separation chamber;

arranging a plurality of first ribs on the front surface of the first pan and welding together the front surface of the first pan and the respective ribs;

arranging a plurality of clad plates on a back surface of the first pan and welding together the back surface of the first pan and one surface of the respective clad plates;

putting the back surface of the first pan over a back surface of the second pan and welding the back surface of the second pan to the other surface of the clad plates;

arranging a plurality of second ribs on the front surface of the second pan and welding the front surface of the second pan to the respective ribs; and inserting frame members into spaces formed between the flange portions of the first pan and the flange portions of the second pan, wherein the partition member is welded to the flange portion before the frame members are inserted into the spaces, among the frame members, the frame members arranged at a top and a bottom of the electrolyzer unit are formed with through-holes at corresponding positions, and after inserting the frame members into the spaces formed between the flange portions of the first pan and the flange portions of the second pan, tension rods are inserted through the through-holes into vacant spaces between the back surface of the first pan and the back surface of the second pan, upper ends of the tension rods are joined to the top frame member and lower ends of the tension rods are joined to the bottom frame member.

5. A method of manufacturing an electrolyzer unit comprising the steps of:

arranging a partition member on a front surface of a first pan formed with flange portions at its periphery and welding at least a part of the partition member to the flange portions of the first pan to form a gas-liquid separation chamber;

arranging a partition member on a front surface of a second pan formed with flange portions at its periphery and welding at least a part of the partition member to the flange portions of the second pan to form a gas-liquid separation chamber;

arranging a plurality of first ribs on the front surface of the first pan and welding together the front surface of the first pan and the respective ribs;

arranging a plurality of clad plates on a back surface of the first pan and welding together the back surface of the first pan and one surface of the respective clad plates;

putting the back surface of the first pan over a back surface of the second pan and welding the back surface of the second pan to the other surface of the clad plates;

arranging a plurality of second ribs on the front surface of the second pan and welding the front surface of the second pan to the respective ribs; and inserting frame members into spaces formed between the flange portions of the first pan and the flange portions of the second pan, wherein when arranging the first ribs on the front surface of the first pan, front ends of the respective ribs are fitted into a plurality of openings formed beforehand in the partition member and then welding between the front surface of the first pan and the respective ribs is carried out, when arranging the second ribs on the front surface of the second pan, front ends of the respective ribs are fitted into a plurality of openings formed beforehand in the partition member and then welding between the front surface of the second pan and the respective ribs is carried out, among the frame members, the frame members arranged at a top and a bottom of the electrolyzer unit are formed with through-holes at corresponding positions, and after inserting the frame members into the spaces formed between the flange portions of the first pan and the flange portions of the second pan, tension rods are inserted through the through-holes into vacant spaces between the back surface of the first pan and the back surface of the second pan, upper ends of the tension rods are joined to the top frame member and lower ends of the tension rods are joined to the bottom frame member.

* * * * *